US010193769B2

(12) United States Patent
Schwengler et al.

(10) Patent No.: US 10,193,769 B2
(45) Date of Patent: Jan. 29, 2019

(54) NETWORK SERVICES API

(71) Applicant: CenturyLink Intellectual Property LLC, Denver, CO (US)

(72) Inventors: Thomas Schwengler, Lakewood, CO (US); Steven M. Casey, Littleton, CO (US); Kevin M. McBride, Lone Tree, CO (US); Felipe Castro, Erie, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 50 days.

(21) Appl. No.: 14/562,088

(22) Filed: Dec. 5, 2014

(65) Prior Publication Data

US 2015/0333979 A1 Nov. 19, 2015

Related U.S. Application Data

(60) Provisional application No. 61/994,609, filed on May 16, 2014, provisional application No. 62/000,367, (Continued)

(51) Int. Cl.
*H04L 12/24* (2006.01)
*G06Q 30/02* (2012.01)
(Continued)

(52) U.S. Cl.
CPC ...... *H04L 41/5054* (2013.01); *G06F 9/45558* (2013.01); *G06Q 30/02* (2013.01);
(Continued)

(58) Field of Classification Search
CPC .. H04L 41/5054; H04L 67/10; G06F 9/45558
See application file for complete search history.

(56) References Cited

U.S. PATENT DOCUMENTS

| 8,495,611 | B2 | 7/2013 | McCarthy |
| 9,258,237 | B1 | 2/2016 | Smith et al. |

(Continued)

FOREIGN PATENT DOCUMENTS

| KR | 10-2012-0051382 | 5/2012 |
| WO | WO-2015/175223 | 11/2015 |

OTHER PUBLICATIONS

Group Specification 'ETSI GS NFV 001-004 V1.1.1' (Oct. 2013) to ETSI.*

(Continued)

*Primary Examiner* — June Y Sison
(74) *Attorney, Agent, or Firm* — Adsero IP

(57) ABSTRACT

Novel tools and techniques are provided for invoking virtualized network functions. In some embodiments, a programmable service backbone might comprise at least one virtualized network function, and might provide virtualized network functions required to provision a service offering. In some cases, at least one application programming interface might be configured to invoke the at least one virtualized network function of the programmable service backbone. An application programming interface gateway might be configured to manage access to the at least one application programming interface, and the application programming interface gateway might comprise a security layer. Virtualized service equipment, which might be in communication with the application programming interface gateway, might provide authentication indicative of selected virtualized network functions associated with the service offering, and the security layer might release an authorized subset of virtualized network functions of the at least one virtualized network function based on the authentication.

21 Claims, 10 Drawing Sheets

Related U.S. Application Data filed on May 19, 2014, provisional application No. 62/001,292, filed on May 21, 2014.

(51) Int. Cl.
*H04L 12/911* (2013.01)
*H04L 29/08* (2006.01)
*G06F 9/455* (2018.01)
*H04L 29/06* (2006.01)
*H04L 12/64* (2006.01)

(52) U.S. Cl.
CPC ..... *G06Q 30/0277* (2013.01); *H04L 12/6418* (2013.01); *H04L 47/70* (2013.01); *H04L 63/20* (2013.01); *H04L 67/10* (2013.01); *G06F 2009/45595* (2013.01)

(56) References Cited

U.S. PATENT DOCUMENTS

| | | | |
|---|---|---|---|
| 9,471,349 B1 | 10/2016 | Stone et al. | |
| 9,680,836 B2 | 6/2017 | White | |
| 9,936,047 B2 | 4/2018 | Adolph | |
| 10,009,443 B1 | 6/2018 | Guigli | |
| 10,089,129 B2 | 10/2018 | Banzhaf | |
| 2002/0049803 A1 | 4/2002 | Bandhole et al. | |
| 2005/0060551 A1 | 3/2005 | Barchi | |
| 2009/0099940 A1 | 4/2009 | Frederick et al. | |
| 2009/0276771 A1 | 11/2009 | Nickolov | |
| 2009/0304060 A1 | 12/2009 | Schenk | |
| 2010/0332262 A1 | 12/2010 | Horvitz et al. | |
| 2010/0332401 A1 | 12/2010 | Prahlad | |
| 2010/0332684 A1 | 12/2010 | Selitser et al. | |
| 2011/0016214 A1 | 1/2011 | Jackson | |
| 2011/0096728 A1* | 4/2011 | Wu | H04L 12/66 370/328 |
| 2011/0145094 A1 | 6/2011 | Dawson et al. | |
| 2011/0153806 A1 | 6/2011 | Bagasra | |
| 2011/0283017 A1 | 11/2011 | Alkhatib et al. | |
| 2012/0117565 A1 | 5/2012 | Staelin et al. | |
| 2012/0131232 A1 | 5/2012 | Brownlow et al. | |
| 2012/0131579 A1 | 5/2012 | Pujolle | |
| 2012/0179538 A1 | 7/2012 | Hines et al. | |
| 2012/0316676 A1 | 12/2012 | Fouillade | |
| 2012/0324061 A1 | 12/2012 | Parsons | |
| 2013/0031028 A1 | 1/2013 | Martin | |
| 2013/0035869 A1 | 2/2013 | Minges | |
| 2013/0058339 A1* | 3/2013 | Casado | H04L 12/4633 370/392 |
| 2013/0067090 A1 | 3/2013 | Batrouni et al. | |
| 2013/0303884 A1 | 11/2013 | Kuntz | |
| 2014/0006482 A1 | 1/2014 | Raghu | |
| 2014/0059226 A1 | 2/2014 | Messerli | |
| 2014/0074647 A1 | 3/2014 | Mukherjee et al. | |
| 2014/0108792 A1 | 4/2014 | Borzycki | |
| 2014/0181267 A1* | 6/2014 | Wadkins | H04L 69/163 709/219 |
| 2014/0200840 A1 | 7/2014 | Cox | |
| 2014/0227976 A1 | 8/2014 | Callaghan | |
| 2014/0229945 A1* | 8/2014 | Barkai | H04L 49/70 718/1 |
| 2014/0279201 A1 | 9/2014 | Iyoob | |
| 2014/0280964 A1 | 9/2014 | Farooq et al. | |
| 2014/0280978 A1 | 9/2014 | Martinez | |
| 2014/0317293 A1 | 10/2014 | Shatzkamer | |
| 2014/0324647 A1 | 10/2014 | Iyoob | |
| 2014/0365662 A1 | 12/2014 | Dave | |
| 2015/0012763 A1 | 1/2015 | Cohen | |
| 2015/0012977 A1 | 1/2015 | Huh | |
| 2015/0039737 A1 | 2/2015 | Smith | |
| 2015/0063166 A1 | 3/2015 | Sif | |
| 2015/0067171 A1 | 3/2015 | Yum | |
| 2015/0071271 A1 | 3/2015 | Smedman | |
| 2015/0095936 A1 | 4/2015 | Yu | |
| 2015/0113142 A1 | 4/2015 | Adolph et al. | |
| 2015/0195172 A1 | 7/2015 | Abuelsaad | |
| 2015/0206207 A1 | 7/2015 | Marashimhan | |
| 2015/0222723 A1 | 8/2015 | Adapalli | |
| 2015/0295760 A1 | 10/2015 | McBride et al. | |
| 2015/0332351 A1 | 11/2015 | McBride et al. | |
| 2015/0332357 A1 | 11/2015 | McBride et al. | |
| 2015/0341230 A1 | 11/2015 | Dave | |
| 2015/0341240 A1 | 11/2015 | Iyoob | |
| 2016/0019636 A1 | 1/2016 | Adapalli | |
| 2016/0065417 A1 | 3/2016 | Sapuram | |
| 2016/0072815 A1 | 3/2016 | Rieke | |
| 2016/0132214 A1 | 5/2016 | Koushik | |
| 2016/0197835 A1 | 7/2016 | Luft | |
| 2016/0212012 A1 | 7/2016 | Young | |
| 2017/0005873 A1 | 1/2017 | Strandzhev | |
| 2017/0078216 A1 | 3/2017 | Adolph | |
| 2017/0346704 A1 | 11/2017 | Strijkers | |
| 2018/0034664 A1 | 2/2018 | Mulligan | |
| 2018/0146049 A1 | 5/2018 | Africa | |
| 2018/0260251 A1 | 9/2018 | Beveridge | |

OTHER PUBLICATIONS

OpenFlow paper 'FlowVisor: A Network Virtualization Layer' (Oct. 14, 2009) to Sherwood et al.*
Internet-draft "Virtual Network Function Configuration Architecture" (Sep. 23, 2013) to Zhou et al. ("Zhou") [draft-zhou-opsawg-vnf-config-arch-00].*
International App. No. PCT/US2015/028330; International Search Report and Written Opinion dated Jul. 20, 2015; 10 pages.
U.S. Appl. No. 14/562,097; Non-Final Rejection dated Jun. 29, 2016; 21 pages.
U.S. Appl. No. 14/527,604; Non-Final Rejection dated Sep. 21, 2016; 43 pages.
U.S. Appl. No. 14/527,604; Non-Final Rejection dated May 24, 2017; 33 pages.
U.S. Appl. No. 14/562,076; Non-Final Rejection dated Jun. 2, 2017; 37 pages.
U.S. Appl. No. 14/562,097; Non-Final Rejection dated Mar. 8, 2017; 21 pages.
International App. No. PCT/US2015/028330; International Preliminary Report on Patentability dated Dec. 1, 2016; 7 pages.
U.S. Appl. No. 14/527,604; Final Rejection dated Jan. 23, 2017; 33 pages.
U.S. Appl. No. 14/562,097; Final Rejection dated Nov. 7, 2016; 18 pages.
U.S. Appl. No. 14/527,604; Final Rejection dated Sep. 13, 2017; 43 pages.
U.S. Appl. No. 14/562,097; Final Rejection dated Jul. 5, 2017; 20 pages.
European Extended Search Report, Application No. PCT/US2015-028330 dated Oct. 23, 2017; 9 pages.

* cited by examiner

NETWORK SERVICES API

CROSS-REFERENCES TO RELATED APPLICATIONS

This application claims priority to each of the following applications: U.S. Patent Application Ser. No. 61/994,609 (the " '609 Application"), filed May 16, 2014 by Kevin M. McBride et al., entitled, "Service Provider Cloud Services"; U.S. Patent Application Ser. No. 62/000,367 (the " '367 Application"), filed May 19, 2014 by Thomas Schwengler et al., entitled, "Network Services API"; and U.S. Patent Application Ser. No. 62/001,292 (the " '292 Application"), filed May 21, 2014 by Kevin M. McBride et al., entitled, "Service Provider Cloud Services—Cloud Marketplace."

This application may also be related to U.S. Patent Application Ser. No. 61/977,284 (the " '284 Application"), filed Apr. 9, 2014 by Kevin M. McBride et al., entitled, "Cloud Computing Adaptive Cloud Devices"; U.S. application Ser. No. 14/527,604 (the " '604 Application"), filed Oct. 29, 2014 by Kevin M. McBride et al., entitled "System and Method for Cloud Computing Adaptive Cloud Services," which claims priority to the '284 Application; U.S. patent application Ser. No. 14/562,076 (the " '076 Application"), filed on a date even herewith by Kevin M. McBride et al., entitled, "System and Method for Service Provider Cloud Services" and U.S. patent application Ser. No. 14/562,097 (the "'097 Application"), filed on a date even herewith by Kevin M. McBride et al., entitled, "System and Method for Service Provider Cloud Services—Cloud Marketplace," each of which also claims priority to each of the '609, '367, and '292 Applications.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to provisioning cloud services, and more particularly to methods, systems, and computer software for provisioning cloud network resources to a content provider for providing cloud services to a customer and provisioning cloud network resources for the cloud services for the customer.

BACKGROUND

Traditionally, residential and commercial customers acquire various content provider services over the Internet or other network directly from a content provider over the Internet or other wide area network provided by an Internet service provider. In such an arrangement, the customer must separately purchase Internet service from an Internet service provider and the desired content service from the content provider. Similarly, content providers, must rely on a customer to have Internet service to access and receive content provider services from the content provider.

Internet services would be activated to a customer premises before a customer can connect to the Internet via a gateway device. Conventional gateway devices come with pre-loaded firmware, or otherwise with some other pre-loaded configuration(s), by the service provider or manufacturer. These gateway devices must be shipped to a customer by the Internet service provider, or the customer must separately purchase such equipment. Moreover, once installed, the devices' functions are limited to their purpose-specific capacity as a residential or commercial gateway device. As a result, the gateway devices have limited upgradability, and in many situations, cannot be used between different service providers or to receive different types of services. This forces the customer to use multiple fixed-function service devices to receive upgraded or additional services, or alternatively to replace older equipment altogether.

Hence, there is a need for an adaptive solution to provisioning services to customers, and for content providers to offer their services to customers, without need either for multiple devices (or types of devices) and/or for replacing existing devices. Furthermore, there is a need to move the capability and functionality of gateway devices beyond their physical hardware implementations. In particular, a robust system is needed for provisioning services to customers and for content providers to offer their services to customers.

BRIEF SUMMARY

According to a set of embodiments, a smart cloud adaptive device is provided that allows for remote configuring or orchestrating, by a service provider over a network, of multifunctional capabilities and functionalities on the smart cloud adaptive device (which, in some cases, is located at a customer premises).

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system might be utilized for invoking virtualized network functions. The system might comprise a programmable service backbone, at least one application programming interface, an application programming interface gateway, and virtualized service equipment. The programmable service backbone might comprise at least one virtualized network function, and might provide virtualized network functions required to provision a service offering. The at least one application programming interface might be configured to invoke the at least one virtualized network function of the programmable service backbone. The application programming interface gateway might be configured to manage access to the at least one application programming interface, and the application programming interface gateway might comprise a security layer. The virtualized service equipment might be in communication with the application programming interface gateway, and might provide authentication indicative of selected virtualized network functions associated with the service offering. The security layer might release an authorized subset of virtualized network functions of the at least one virtualized network function based on the authentication.

In some embodiments, the service offering might comprise one or more network services. In some cases, the service offering might comprise one or more app services. According to some embodiments, the at least one application programming interface might be configured to be implemented in one or more integrated development environments. In some instances, the at least one application programming interface might include one or more test suites. The one or more test suites might determine whether applications invoking the application programming interface comply with one or more network access and use policies.

Merely by way of example, in some embodiments, the system might further comprise an operating system, which might be associated with the at least one application programming interface, and might be configured to access the programmable service backbone. The at least one application programming interface might invoke the at least one virtualized network function via the operating system. According to some embodiments, the at least one application programming interface might comprise a set of application programming interfaces, and the security layer might release an authorized subset of the set of application programming interfaces based on the authentication.

In another aspect, an apparatus might comprise at least one application programming interface and a security layer. The at least one application programming interface might be configured to invoke at least one virtualized network function in a programmable service backbone, and the at least one virtualized network function might be associated with provisioning a selected service offering. The security layer might be configured to release an authorized subset of virtualized network functions of the at least one virtualized network function based on an authentication.

According to some embodiments, the apparatus might be an application programming interface gateway. In some cases, the service offering might comprise one or more network services. In some instances, the service offering might comprise one or more app services.

In some embodiments, the at least one application programming interface might include one or more test suites, which might determine whether applications invoking the application programming interface comply with one or more network access and use policies. In some cases, the at least one application programming interface might invoke the at least one virtualized network function via an operating system associated with the at least one application programming interface.

In some instances, the security layer might release an authorized subset of the at least one application programming interface based on the authentication. In some embodiments, a service offering might comprise a customer offering, and the authorized subset of the at least one application programming interface is configured to be invoked by the customer offering. In some cases, the authorized subset of the at least one application programming interface might be configured to be made available in one or more integrated development environments.

In yet another aspect, a method might be implemented for invoking virtualized network functions. The method might comprise receiving an authentication indicative of virtualized network functions associated with provisioning a selected service offering, authorizing access to one or more virtualized network functions based on the authentication, and invoking the one or more virtualized network functions needed to provision the selected service offering via at least one application programming interface.

In some embodiments, the method might further comprise testing calls to the one or more virtualized network functions for compliance with one or more network access and use policies. In some cases, each of the one or more virtualized network functions might be invoked via a system invocation in an operating system associated with the at least one application programming interface. According to some embodiments, the method might further comprise authorizing access to an authorized subset of the at least one application programming interface based on the authentication. In some instances, the method might further comprise invoking the authorized subset of the at least one application programming interface via a customer offering, which might be a service offering the selection of which causes invocation of the one or more virtualized network functions.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

FIGS. 1-10 illustrate a system and method for providing service provider cloud services. FIGS. 1-10 may refer to examples of different embodiments that include various components and steps, which can be considered alternatives or which can be used in conjunction with one another in the various embodiments. Furthermore, the accompanying descriptions of FIGS. 1-10 are provided for purposes of illustration and should not be considered to limit the scope of the different embodiments.

Figure 1:
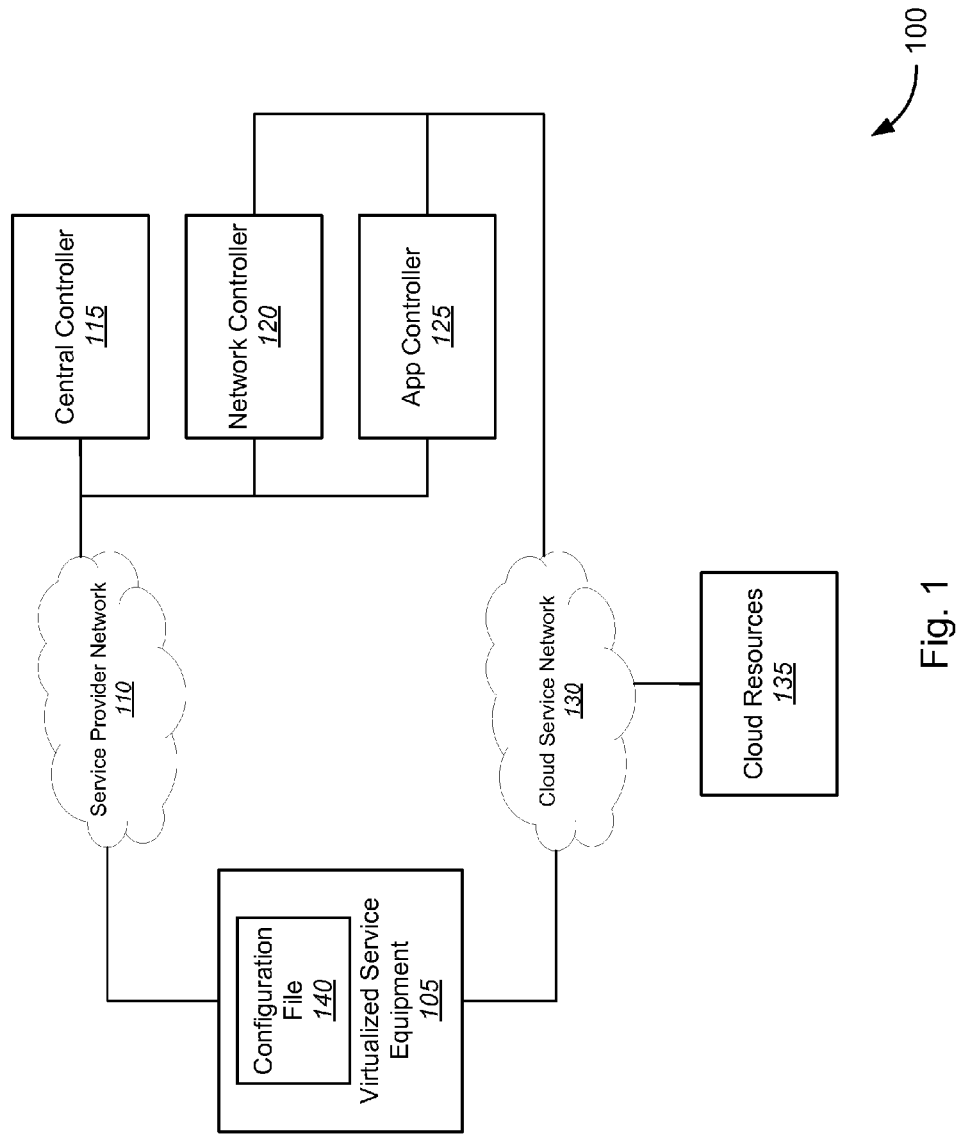
FIG. 1 is a block diagram of a system for provisioning service provider cloud services, in accordance with various embodiments.

FIG. 1 is a block diagram of a system 100 for configuring and provisioning service provider cloud services, in accordance with various embodiments. The system 100 includes virtualized service equipment ("VSE") 105 in communication with one or more of a central controller 115, a network controller 120, an app controller 125, and/or cloud resources 135. The VSE 105 communicates with central controller 115, network controller 120, and/or app controller 125 via a service provider network 110. The VSE 105 accesses cloud resources 135 (which is herein referred to as either "cloud resources" or "cloud network resources") via cloud service network 130.

Herein, "virtualized service equipment" or "VSE" might refer to a dedicated hardware device (whose functionalities may be virtualized as described in detail below) or might refer to a virtualized application or program hosted on a virtual machine running on a physical device, unless specifically stated otherwise. The physical device might include, but is not limited to, a user device or a service provider device. The user device might include, without limitation, a gaming console, a digital video recording and playback device ("DVR"), a set-top or set-back box ("STB"), a television set ("TV"), a desktop computer, a mobile user device, and/or the like. The mobile user device might include, but is not limited to, a laptop computer, a tablet computer, a smart phone, a mobile phone, a portable gaming device, and/or the like. The TV might include, without limitation, a high-definition ("HD") television, an Internet Protocol television ("IPTV"), and a cable television, or the like, where one or both of HDTV and IPTV may be interactive TVs. The service provider device might include, but is not limited to, a customer premises equipment ("CPE"), a residential gateway ("RG"), a network access point ("NAP"), a network interface device ("NID"), an optical network interface ("ONT"), a network device, and/or the like. In some cases, the CPE might include any of the user devices described above. In other cases, at least some of the user devices described above, the CPE, the RG, the NAP, the NID, and the ONT, might be located at the customer premises. In some instances, the NAP and the network device might be located at any location along the network between the customer premises and a digital subscriber line multiple access ("DSLAM"), between the DSLAM and a central office ("CO"), between the CO and another network, between the VSE hosted on the user device or service provider device and the other network, and/or the like. Each of the network and/or the other network might include, without limitation, a local area network ("LAN"), including, without limitation, a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol, or any other wireless protocol; or any combination of these or other networks.

The service provider network 110 and the cloud service network 130 might be operated by a network service provider. In some embodiments, the cloud service network 130 may be included within or as part of the service provider network 110. Alternatively, in some embodiments, the service provider network 110 and the cloud service network 130 might be the same network. In various embodiments, each of the service provider network 110 and the cloud service network 130, like the network or other network described above, might include, without limitation, a LAN, including without limitation a fiber network, an Ethernet network, or the like; a WAN; a WWAN; a virtual network, such as a VPN; the Internet; an intranet; an extranet; a PSTN; an infra-red network; a wireless network, including without limitation a network operating under any of the IEEE 802.11 suite of protocols, the Bluetooth™ protocol, or any other wireless protocol; or any combination of these or other networks.

In various embodiments, the VSE 105 might be customer premises equipment that is software-definable for performing various functions. In some embodiments, the VSE 105 is pre-loaded with firmware to provide functionality associated with services ordered by the customer. Alternatively, in other embodiments the VSE 105 is pre-loaded with firmware for establishing communications with a central controller 115 over service provider network 110. In such embodiments, the VSE 105 registers itself with a central controller 115 in order to receive a configuration file 140 from the central controller 115. In some cases, the VSE 105 might receive the configuration file 140 in response to registering with the central controller 115. In some embodiments, the configuration file 140 may include a virtual image of specific customer premises equipment. Herein, an "image" or a "virtual image" of specific customer premises equipment might refer to software or a software program that provides a specific function. In one example, an image of a video set-top box might be a software program that provides video services to a residential home or the like. This image might be captured and configured for a set of hardware platforms. In another example, an image of a network router might be a software program that loads on a virtual machine and performs network traffic routing for an individual's network or service provider network. In some embodiments, the images from the central controller 115 may be of one or more virtual machines, such as set-top boxes, cable modems, optical network terminals, voice over Internet protocol ("VoIP") devices, among other devices. In some further embodiments, the virtual machines may be application-specific to run apps and/or provide services specifically ordered by the customer.

According to one set of embodiments, a customer may utilize the VSE 105 to purchase apps and/or receive various cloud-based services. For example, in some embodiments, the VSE 105 might be configured to establish a connection with, and retrieve one or more images from, the central controller 115. In various embodiments, this process may occur automatically upon connection to a service provider network 110. The one or more images may be configured to allow the VSE 105 to access, retrieve, and/or graphically display a cloud services marketplace (or a user interface of the cloud services marketplace) to the user of the VSE 105. The user interface of the cloud services marketplace might comprise a plurality of service offerings for selection. In various other embodiments, the VSE 105 may be pre-loaded with firmware to present a cloud services marketplace from which the customer may select various apps and services, with or without a connection to the service provider network 110.

In some embodiments, the VSE 105 may then contact the central controller 115 via the service provider network 110 to retrieve images for various customer premises equipment or other virtual machines, corresponding to user selections in the marketplace. In other embodiments, the VSE 105 may have several pre-loaded images that allow the VSE 105 to directly access a cloud service network 130 and immediately begin receiving cloud services from the cloud service network 130, which might allocate or provision appropriate cloud resources or cloud network resources 135 for providing the cloud services to the VSE 105. In such embodiments, the VSE 105 acts as a host machine managing one or more "guest" virtual machines. Thus, when loaded with an image, the VSE 105 can act as any of the one or more "guest" virtual machines, providing connectivity to service provider network 110, cloud service network 130, or both. According to one set of embodiments, the VSE 105 is a smart cloud adaptive device as described in the '604 Application, which has already been incorporated herein by reference in its entirety.

VSE 105 calls network controller 120 to allocate various network hardware from a pool of cloud resources or cloud network resources 135 to provision the selected cloud apps and services. Cloud resources or cloud network resources 135 may include, without limitation, network hardware, both dedicated and shared; and network bandwidth. In some embodiments, the cloud resources 135 may be allocated based on tiers. The tiers of hardware may be established corresponding to the selected cloud apps or services. For example, less hardware intensive cloud apps and services may be assigned a lower tier of hardware, whereas more hardware intensive cloud apps and services may be assigned a higher tier of hardware. In some embodiments, the apps or services may be priced according to the tier of hardware or bandwidth assigned by the network controller 120. Alternatively, in some embodiments, tiers of hardware may be selected based on a customer's desired level of network performance. In such embodiments, the customer may be charged based on the selected tier, on an individual basis determined by a customer's usage of cloud resources 135, based on the tier of hardware and/or bandwidth required by the cloud apps or services, or simply based on the selected apps and/or services themselves. In various embodiments, the network controller 120 may allocate or provision cloud resources 135 dynamically based on the user selections of various apps and/or services in the marketplace, or in some cases in response to receiving the selection of one or more service offerings. In some cases, the cloud network resources 135 might form part of a programmable service backbone ("PSB") for providing the selected one or more service offerings. The allocation may occur substantially in real-time so as to allow near-instantaneous provisioning of the selected apps and services. In some embodiments, the network controller might provision cloud network resources, as part of a PSB, to provide the selected service offerings (e.g., apps, services, etc.). According to some embodiments, provisioning of cloud network resources might include selecting physical network hardware on the cloud service network (in some cases, based on tiers). In some instances, the provisioned network resources might comprise at least part of a virtualized content delivery network ("CDN").

The VSE 105 is further operable to call an app controller 125 to configure app services on the pool of available cloud resources 135. In some cases, the app controller 125 might be configured to setup app services on at least one of the VSE and/or the PSB—in some instances, based on the selected one or more service offerings. The app controller 125 allocates various cloud resources 135 to provision the selected cloud apps and services to the customer.

For example, in some embodiments, a cloud app selected by a customer may require video streaming services. The types and availability of hardware may depend on the tier of hardware selected, as allocated by the network controller 120. The app controller 125 may further allocate the necessary network bandwidth, among other resources, to provide the video streaming services over the cloud service network 130, as required by the cloud app.

In some embodiments, tiers of network bandwidth may be established corresponding to the bandwidth needs of the selected cloud apps and services, customer selections, or the usage habits of the particular user, similar to how tiers of hardware are established. In some embodiments, the tiers of network bandwidth may include, without limitation, differing levels of network speeds, and caps on data usage.

According to another set of embodiments, a content provider may utilize the VSE 105 to purchase and configure various cloud-based services for provisioning cloud apps and services to a customer within the cloud service network 130. In various embodiments, the content provider may plug the VSE 105 into a network-enabled connection, and the VSE 105 might establish communications with a central controller 115 over the service provider network 110. The VSE 105 might register itself with the central controller 115, which may respond by sending an appropriate configuration file 140 (including an image or a virtual image of customer premises equipment or of network equipment, or the like) to the VSE 105 based on the registration. In some instances, the central controller 115 might send a virtual image of a customer premises equipment (or network equipment) to the VSE 104, based on selected one or more service offerings. The virtual image may be a virtual image of a specific piece of network equipment for the content provider to interface with the service provider network 110 or cloud services network 130. For example, in some embodiments, the VSE 105 may obtain an image that allows it to provide content and/or services over the service provider network 110 or cloud services network 130. In other embodiments, the image may allow the VSE 105 to access specific cloud resources 135. In further embodiments, the VSE 105 itself may include a virtual machine ("VM"), or an image of a VM, residing in the cloud service network that is configured to bootstrap to a client device upon the client device connecting to the cloud service network. In some cases, the VSE 105 might comprise customer premises equipment that is configured to connect automatically to the cloud service network.

In various embodiments, the one or more images might be configured to allow the VSE 105 to access, retrieve, and/or graphically display a cloud services marketplace to the user of the VSE 105. In various other embodiments, the VSE 105 may be pre-loaded with firmware to present a service provider cloud services marketplace, with or without a connection to the service provider network. The service provider cloud services marketplace might be an electronic marketplace from which the content provider can purchase cloud resources 135 and/or services on the cloud services network 130. The cloud services network 130 might be operated by the network service provider, and might be accessible to customers of the cloud services network 130. The content provider might choose the various network resources 135 and services that are necessary for the content provider to provide its services to customers over the cloud services network 130. The marketplace may take the form of, without limitation, a web portal or a database from which a graphical representation of various available cloud services is generated. In some embodiments, the marketplace may be displayed by the VSE 105. In some cases, the marketplace might comprise, or might be communicatively coupled with, a marketplace database, which might include cloud services (including current cloud services) to be listed in an index of product offerings and/or service offerings.

VSE 105 might call network controller 120 to allocate the various network hardware from a pool of cloud resources 135 to provision the selected services. In some embodiments, cloud resources 135 may be allocated for the content provider to provide its content to the cloud services network 130. For example, one set of such embodiments may utilize VSE 105 to provide the content. In other embodiments, the cloud resources 135 may be allocated for potential customers of the content provider to access the content provider services via the cloud services network 130, according to the selections of the content provider. In further embodiments, the network controller 120 might allocate cloud resources 135 to provide functionality both to the content provider and customers that wish to receive the content provider services.

As described previously, various embodiments may call for cloud resources 135 to be allocated based on tiers, with the tiers of hardware corresponding to the selected cloud services. For example, services that are less hardware intensive may be assigned a lower tier of hardware, whereas more hardware intensive cloud apps and services may be assigned a higher tier of hardware. Hardware intensive services may include, without limitation, real-time streaming of various media content and/or data, applications that require low-latency, and/or other requirements indicated by the content provider or the selected cloud services themselves, or the like. In some embodiments, the cloud services may be priced according to the tier of hardware assigned by the network controller 120. Alternatively, in some embodiments, tiers of hardware may be selected based on a customer's desired level of network performance.

Similarly, the VSE 105 might also call app controller 125 to configure various app services based on the pool of available cloud resources 135. The app controller 125 might configure the cloud resources 135 allocated by the network controller 120 to provision the content provider services to a customer, as well as for the content provider to provide its content provider services over the cloud service network.

In some embodiments, tiers of network bandwidth may be established corresponding to the bandwidth needs of the selected services, or based on the usage of cloud network resources 135 by customers utilizing the content provider's apps and/or services. In some embodiments, the tiers of network bandwidth may include, without limitation, differing levels of network speeds, caps on data usage, and/or the like.

In this manner, the content provider selects and configures various cloud services from the marketplace to offer an app or other content provider services. In some further embodiments, when a content provider selects various cloud services, the content provider may be allowed access to an application programming interface ("API") layer from which the content provider can access and configure the various cloud resources 135. In various embodiments, the API layer may be defined by the network service provider. The selection of cloud services and configuration of the cloud resources 135 is stored in the cloud services marketplace and is associated with the content provider. When a customer selects an app or purchases services from the content provider, the configuration is applied to the customer's account, thus provisioning the content provider services to the customer.

In such embodiments, the content provider and/or the customer may be charged based on the selected tier; based on an individual basis determined by a customer's usage of cloud resources 135; based on the tier of hardware and/or bandwidth required by the cloud apps or services; or simply based on the selected cloud services themselves. Alternatively, when the customer purchases the content provider services, the network service provider may charge a transaction fee, or take a cut of the purchase price for apps and services offered on the cloud services marketplace.

By way of example, in some embodiments, the content provider may provide a video streaming app. Accordingly, the video streaming app will require various cloud services to function. The cloud services may broadly be categorized, without limitation, as video services, network services, content distribution services, and management services.

Video services may include, without limitation, high-definition ("HD") video streaming, adaptive bit-rate streaming, 4K video streaming, and standard-definition video streaming, among other video services that relate to the provisioning of video content to customers. Network services may include, without limitation, various Open Systems Interconnection model ("OSI") layer 3 and layer 2 network services, including, but not limited to, network security services, firewalls, and last-mile access to customers. Content distribution services may include, without limitation, content distribution network ("CDN") services, such as access control (e.g., geo-blocking), app acceleration, among other services related to the delivery of content. Management services include various services related to the management of the app and/or network. Management services may include, without limitation, simple network management protocol ("SNMP") service, network monitoring services, and usage reporting services, or the like. In some embodiments, for example, the cloud services might include a monitoring service, and the VSE might receive monitoring information from the cloud service network, using the monitoring service. The content provider may purchase these cloud services from the marketplace.

The app controller 125 then might allocate various cloud resources 135 to provide the service, such as hardware available in the pool of available hardware. In some embodiments, the types of hardware, and availability of certain hardware in the pool of available hardware depends on the tier of hardware selected by the network controller 120. The app controller 140 may further allocate the necessary network bandwidth, among other resources, to provide the video streaming services over the cloud service network 130, as required by the cloud app.

According to some embodiments, when it is determined by any or a combination of the central controller 115, the network controller 120, and/or the app controller 125 that at least one of the cloud services is not in use or is no longer being used, the central controller 115, the network controller 120, and/or the app controller 125 might release the provisioned or allocated cloud resources 135 (that are allocated for providing the at least one of the cloud services) so that such cloud resources 135 may be appropriately re-allocated elsewhere.

In some aspects, system 100 might be configured to invoke virtualized network functions. In some embodiments, system 100 might comprise a PSB, at least one API, an API gateway, and VSE in communication with the API gateway. The PSB might comprise at least one virtualized network function ("VNF"), the PSB providing virtualized network functions required to provision a service offering. The at least one API might be configured to invoke the at least one virtualized network function of the programmable service backbone. In some cases, the at least one API might invoke the at least one VNF via an operating system associated with the at least one API. The API gateway might be configured to manage access to the at least one application programming interface. In some cases, the API gateway might comprise a security layer. The VSE might provide authentication indicative of selected virtualized network functions associated with the service offering. In some instances, the security layer might release an authorized subset of virtualized network functions of the at least one virtualized network function based on the authentication.

According to some embodiments, the service offering might include, without limitation, one or more network services, one or more app services, and/or the like, or any combination of these. In some embodiments, the at least one API might be configured to be implemented in one or more integrated development environments ("IDEs"). In some cases, the at least one API might include one or more test suites, which might determine whether applications invoking the application programming interface comply with one or more network access and use policies.

In some embodiments, system 100 might further comprise an operating system, which might be associated with the at least one application programming interface and might be configured to access the PSB. In some cases, the at least one API might invoke the at least one VNF via the operating system. According to some embodiments, the at least one API might include a set of APIs, and the security layer might release an authorized subset of the set of APIs and/or an authorized subset of VNFs of the at least one VNF, based on the authentication. In some instances, the service offering might include, but is not limited to, a customer offering. In some cases, the authorized subset of the at least one API might be configured to be invoked by the customer offering. In some embodiments, the authorized subset of the at least one API might be configured to be made available in one or more IDEs.

Figure 2:
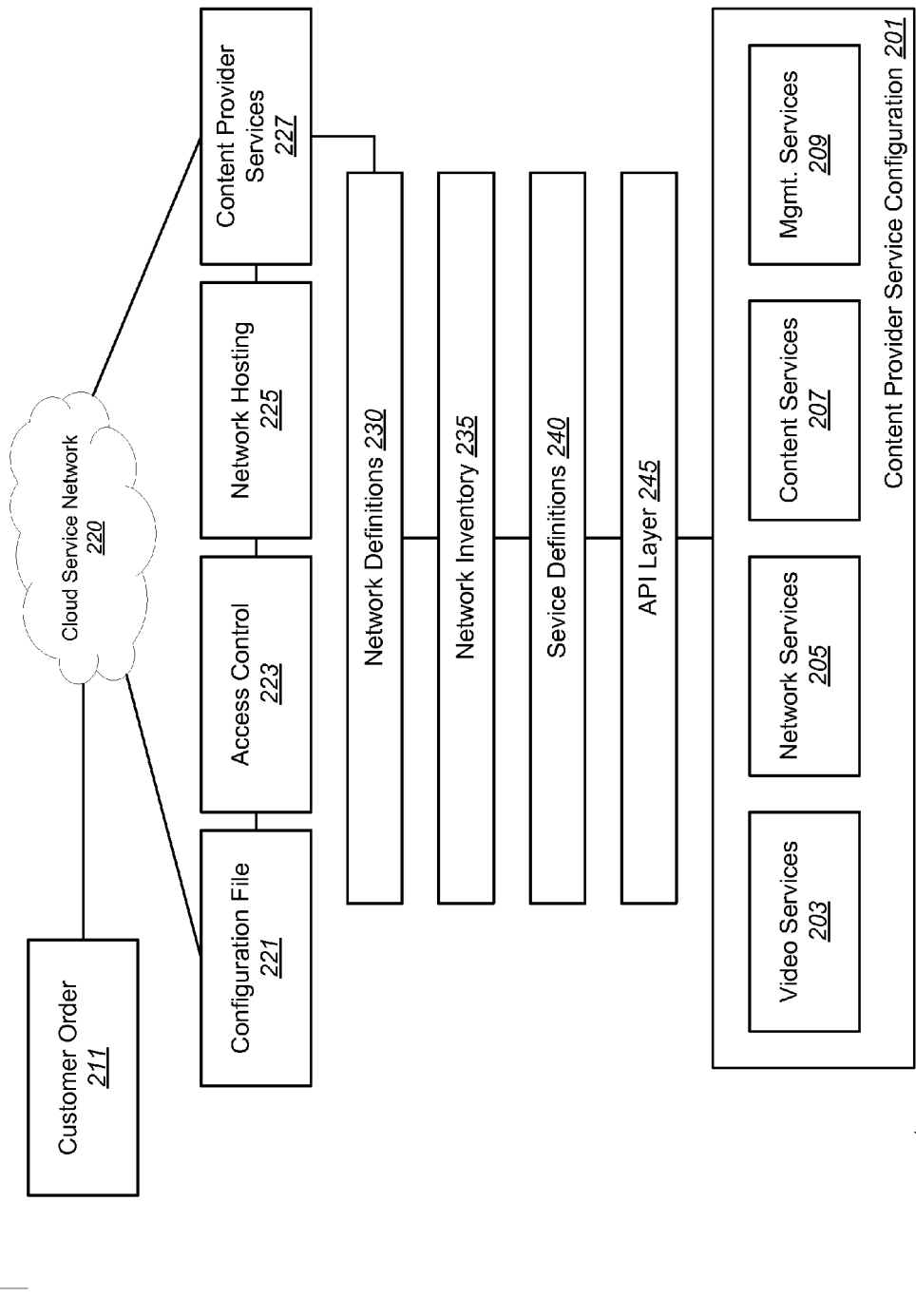
FIG. 2 is a functional block diagram of a system for provisioning service provider cloud services, in accordance with various embodiments.

FIG. 2 illustrates a functional block diagram of a system 200 for provisioning service provider cloud services, in accordance with various embodiments.

A content provider might provide service configuration 201 that defines the various content provider services to be provided, via the cloud service network 220, to a customer. The content provider service configuration 201 might include definitions of services including, but not limited to, various video services 203, network services 205, content services 207, and/or management services 209, or the like, as selected by the content provider. In various embodiments, the content provider service configuration 201 may include definitions of services including all or a subset of various video services 203, network services 205, content services 207, and/or management services 209, or the like. For example, in some embodiments, the content provider service configuration 201 may include definitions of various video services 203, network services 205, and content services 207, but not management services 209. In other embodiments, the content provider service configuration 201 may include definitions of other permutations of the video, network, content, and management services 203, 205, 207, and 209.

The content provider may have access to a network service provider defined application programming interface ("API") via the API layer 245, based on the selected cloud services in the content provider service configuration 201. Thus, each of the selected video services 203, network services 205, content services 207, and/or management services 209 are translated into their respective service definitions 240 via the API layer 245. In some embodiments, the content provider may create its own service definitions utilizing the network service provider defined API.

Network inventory 235 might include the various network resources and components, as utilized by the various services of the content provider service configuration 201. In various embodiments, the network inventory 235 may include various resources available in a programmable network as defined by a content provider. In other embodiments, the network inventory 235 may include, without limitation, a pool of cloud resources available to the client provider and/or customer. In further embodiments, the network inventory 235 may be identified by the service definitions 240, or by definitions of the cloud services 203, 205, 207, and/or 209 indicated in the content provider service configuration 201. Alternatively, or additionally, the content provider may separately indicate various network inventory 235. In some embodiments, the network inventory 235 may be software-defined, and executed by machines on the cloud service network 220. In other embodiments, the network inventory 235 may include various pieces of physical equipment on the cloud service network.

Network definitions 230 may be provided for each of the network resources and components of network inventory 235 to be utilized by the content provider services. In some embodiments, the network definitions 230 may be defined and provided by the network service provider as a standard component accessible via the API layer 245. In other embodiments, network definitions 230 may be written by the content service provider. For example, a specialized piece of service equipment may be defined based on the content provider's specifications.

When a customer order 211 is received at the cloud service network 220, the content provider service configuration 201 may be applied, in real-time, to that customer's account. Thus, a customer is able to order and receive content provider services 227 over the cloud service network 220 in real-time or near real-time, in a nearly instantaneous manner. Upon receipt of the customer order 211 by the cloud service network 220, a configuration file 221 may be retrieved and transmitted to a customer VSE. The VSE might be provided with access, by access control 223, to network hosting functionality 225, as provided by the cloud service network 220. In some embodiments, the network hosting functionality 225 may include a terabit point-of-presence ("TeraPoP") to the Internet, a third-party CDN, or other networks separate from the cloud service network 220. In other embodiments, the network hosting functionality 225 may include access to the content-provider's programmable network as hosted by cloud service network 220. Content provider services 227 may then be accessed by the customer via the network hosting functionality 225, with the content provider services 227 defined, as described above, by the network definitions 230 and service definitions 240 that are based on definitions of cloud services 203-209 as provided in the content provider service configuration 201.

Figure 3:
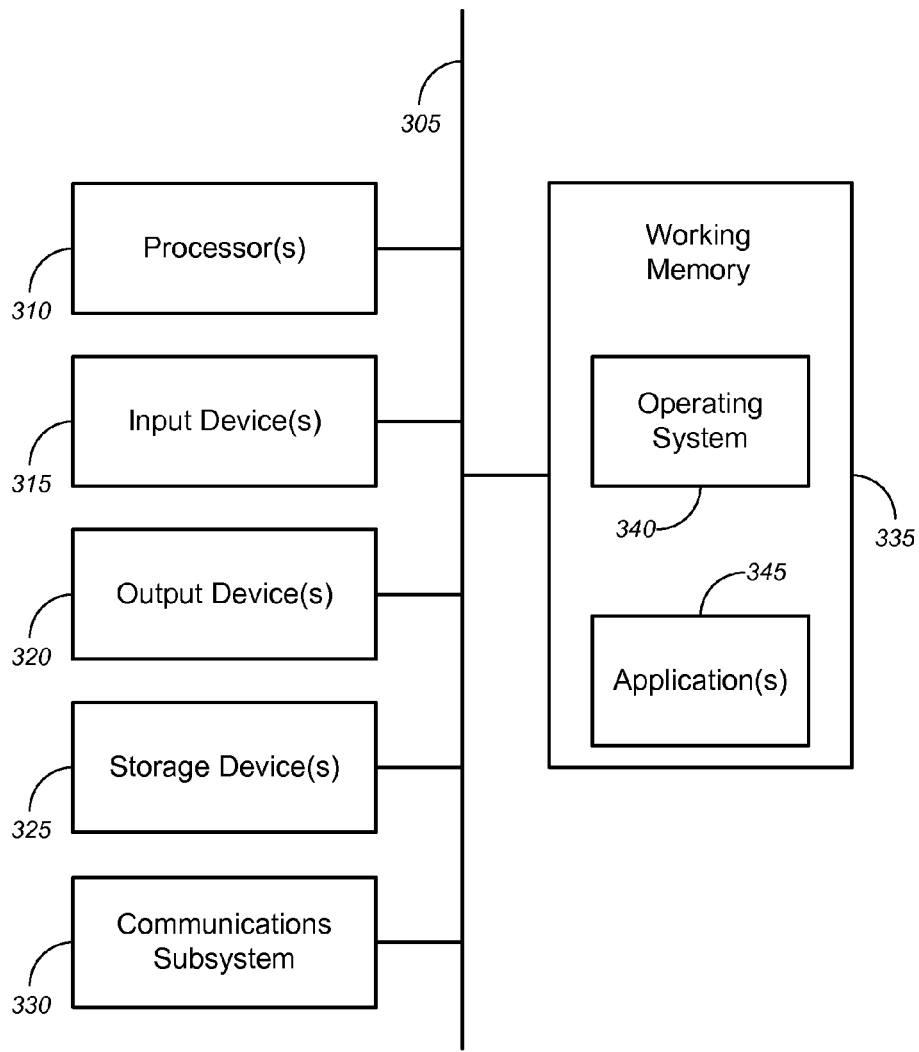
FIG. 3 is a block diagram illustrating an exemplary computer architecture that may be used for provisioning service provider cloud services, in accordance with various embodiments.

We now turn to FIG. 3, which is a block diagram illustrating an exemplary computer architecture that may be used for provisioning service provider cloud services, in accordance with various embodiments. FIG. 3 provides a schematic illustration of one embodiment of a computer system 300 that can perform the methods provided by various other embodiments, as described herein, and/or can perform the functions of the user devices, the network devices, the hardware-based VSE, or any other computer systems as described above. It should be noted that FIG. 3 is meant only to provide a generalized illustration of various components, of which one or more (or none) of each may be utilized as appropriate. FIG. 3, therefore, broadly illustrates how individual system elements may be implemented in a relatively separated or relatively more integrated manner.

The computer system 300 includes a plurality of hardware elements that can be electrically coupled via a bus 305 (or may otherwise be in communication, as appropriate). The hardware elements may include one or more processors 310, including, without limitation, one or more general-purpose processors and/or one or more special-purpose processors (such as digital signal processing chips, graphics acceleration processors, and/or the like); one or more input devices 315, which can include, without limitation, a mouse, a keyboard, and/or the like; and one or more output devices 320, which can include, without limitation, a display device, a printer, and/or the like. The input and output devices 315, 320 interact with the computer system 300 over various input/output ("I/O") interfaces. In various embodiments, I/O interfaces include any ports, connectors, and communication protocols and standards that may be used by the computer system 300, and any input or output devices 315, 320 connected to the computer system 300, to send and receive data related to cloud services service needed by the user devices. I/O interfaces may include, but are not limited to, Ethernet ports, universal serial bus ("USB") ports, coaxial connector ports, RCA connector ports, high-definition multimedia interface ("HDMI") ports, digital visual interface ("DVI") ports, DisplayPort ports, video graphics array ("VGA") connector ports, optical fiber connector ports, phone connector jacks, standard telephone plugs or jacks, or any suitable interfaces capable of transferring audio, video, and/or data signals.

The computer system 300 may further include, or be in communication with, one or more storage devices 325. The one or more storage devices 325 can comprise, without limitation, local and/or network accessible storage, or can include, without limitation, a disk drive, a drive array, an optical storage device, a solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including, without limitation, various file systems, database structures, or the like.

The computer system 300 might also include a communications subsystem 330, which can include, without limitation, a modem, a network card (wireless or wired), an infra-red communication device, a wireless programmable radio, or a wireless communication device. Wireless communication devices may further include, without limitation, a Bluetooth device, an 802.11 device, a WiFi device, a WiMax device, a WWAN device, cellular communication facilities, or the like.

In some embodiments, a wireless programmable radio is provided, capable of wirelessly communicating with one or more servers or network controllers on the service provider network. The wireless programmable radio may be a software defined radio ("SDR") capable of establishing communications to a service provider's network termination devices, in any of a multicast, a unicast, an anycast, a geocast, or a broadcast fashion. The wireless programmable radio may establish a connection to a service provider controlled network termination device, including, but not limited to, a cellular network base station, a digital subscriber line access multiplexer ("DSLAM"), cable modem termination system, optical line termination ("OLT"), a wireless node in a distributed antenna system ("DAS"), or other service provider controlled remote terminal or network device at a central office ("CO") or headend of a service provider network. Connections may be established by the wireless programmable radio over WiFi, WiMax, 3G or 4G (such as LTE), or other suitable connections having an effective range to reach the various network termination devices. The wireless programmable radio may connect to a specific network termination device, multiple network termination devices, or a set of network termination devices, based on pre-loaded firmware or other code that initializes the wireless programmable radio upon startup. In yet other embodiments, the wireless programmable radios may be pre-configured to operate only with one or more specific service provider's network termination devices.

The communications subsystem 330 may permit data to be exchanged with a network, such as the cloud service network, service provider network, or both, as described above. Communications subsystem 330 may also permit data to be exchanged with other computer systems, and/or with any other devices described herein, or with any combination of network, systems, and devices. According to some embodiments, the network might include a local area network ("LAN"), including without limitation a fiber network, or an Ethernet network; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth protocol, or any other wireless protocol; or any combination of these or other networks.

In many embodiments, the computer system 300 will further comprise a working memory 335, which can include a RAM or ROM device, as described above.

The computer system 300 also may comprise software elements, shown as being currently located within the working memory 335, including an operating system 340, device drivers, executable libraries, and/or other code. The software elements may include one or more application programs 345, which may comprise computer programs provided by various embodiments, and/or may be designed to implement methods and/or configure systems provided by other embodiments, as described herein.

By way of example, one or more procedures described with respect to the methods discussed herein might be implemented as code and/or instructions executable by a computer (and/or a processor within a computer). In an aspect, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 325 described above. In some cases, the storage medium might be incorporated within a computer system, such as the computer system 300. In other embodiments, the storage medium might be separate from the computer system 300—that is, a removable medium, such as a compact disc, or the like. In some embodiments, the storage medium might be provided in an installation package, such that the storage medium can be used to program, configure, and/or adapt a general purpose computer with the instructions/code stored thereon. These instructions might take the form of executable code, which is executable by the processor(s) 300 and/or might take the form of source and/or installable code. The source or installable code, upon compilation, installation, or both compilation and installation, on the computer system 300 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, and/or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system 300 to perform methods in accordance with various embodiments of the invention. According to a set of embodiments, some or all of the procedures of such methods are performed by the computer system 300 in response to processor 310 executing one or more sequences of one or more instructions. The one or more instructions might be incorporated into the operating system 340 and/or other code that may be contained in working memory 335, such as an application program 345. Such instructions may be read into the working memory 335 from another computer readable medium, such as one or more of the storage device(s) 325. Merely by way of example, execution of the sequences of instructions contained in the working memory 335 might cause the processor(s) 310 to perform one or more procedures of the methods described herein.

The terms "machine readable medium" and "computer readable medium," as used herein, refer to any medium that participates in providing data that causes a machine to operation in a specific fashion. In one set of embodiments, various computer readable media might be involved in providing instructions/code to processor(s) 310 for execution, might be used to store and/or carry such instructions/code such as signals, or both. In many implementations, a computer readable medium is a non-transitory, physical, and/or tangible storage medium. Such a medium may take many forms, including, but not limited to, non-volatile media, volatile media, and transmission media. Non-volatile media includes, for example, optical disks, magnetic disks, or both, such as the storage device(s) 325. Volatile media includes, without limitation, dynamic memory, such as the working memory 335. Transmission media includes, without limitation, coaxial cables, copper wire and fiber optics, including the wires that comprise the bus 305, as well as the various components of the communication subsystem 330, and/or the media by which the communications subsystem 330 provides communication with other devices. Hence, transmission media can also take the form of waves, including, without limitation, radio, acoustic, and/or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium; a RAM, a PROM, an EPROM, a FLASH-EPROM, or any other memory chip or cartridge; a carrier wave; or any other medium from which a computer can read instructions or code.

Various forms of computer readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 310 retrieves and executes the instructions. The instructions received by the working memory 335 may optionally be stored on a storage device 325 either before or after execution by the processor(s) 310.

According to a set of embodiments, the computer system 300 can be plugged directly into and can receive power from a standard alternating current (AC) power plug/wall socket. In other embodiments, the computer system 300 may be powered by an external power supply, adapter, or one or more batteries. Upon booting up, the communications subsystem 330 establishes a connection to a service provider network. In some embodiments, the communications subsystem may establish a connection with a network termination device. The connection may be a wired connection utilizing Ethernet, broadband cable, or optical fiber, or a wireless connection utilizing any of a WiFi, 3G, 4G, or other wireless data connection. Through the communications subsystem 330, the computer system 300 may be able to communicate with a central controller of the service provider network via the network termination device. The computer system 300 might register itself with the central controller that, in response, transmits a configuration file to the computer system 300. The configuration file may correspond to identification information unique to the particular computer system 300, or may identify a customer associated with the computer system 300. Registration of the computer system 300 may include registering a MAC address, a gateway IP address, a customer identification number, a customer account number, service codes, or other information that identifies a customer or the services to be provided by the computer system 300.

The central controller is able to push a configuration file(s) to the computer system 300 based on the registration. Images of various customer premise equipment, each having virtualized architectures, can be pushed to and executed by the computer system 300. In various embodiments, the computer system 300 may be pre-loaded with a base configuration that causes the computer system 300 to retrieve, and display a graphical interface for, a cloud services marketplace offering various cloud and content provider services. In some embodiments, the computer system 300 must register with a central controller to receive the base configuration. In some cases, the base configuration might be loaded on the computer system 300 (e.g., VSE) based on the configuration file.

In various embodiments, the computer system 300 may be pre-loaded with a set of offered cloud and content provider services. In other embodiments, the computer system 300 may retrieve a current set of cloud and content provider services offered on the cloud services marketplace. The customer is able to select cloud network services and/or content provider services from the cloud services marketplace via the computer system 300. The computer system 300 might receive the customer selections and might transmit the selections to the central controller, network controller, and app controller for cloud resource and service provisioning.

According to one set of embodiments, a customer might select one or more desired cloud and/or content provider services. The computer system 300 might transmit the indicated selections to a central controller. The central controller might push a configuration file corresponding to the selected content provider services to the computer system 300. In some embodiments, an image of the customer premise equipment might be sent to the computer system 300 as the configuration file(s). In such embodiments, the computer system 300 might function as a host machine managing one or more "guest" virtual machines. When loaded with a configuration file, the computer system 300 can act as any of the one or more "guest" virtual machines images of the customer premise equipment. The network controller and app controller might correspondingly configure various cloud resources to provision the selected cloud services and/or content provider services.

According to another set of embodiments, a content provider may use the computer system 300 to configure a cloud service network to provision its services to a customer, as described above. In this manner, the content provider might utilize computer system 300 to purchase and configure various cloud services for provisioning its cloud apps and services to a customer within the cloud service network. In various embodiments, the content provider might select various network resources and services necessary to provide its services to customers over the cloud service network. The computer system 300 might receive the selections of the content provider, and might transmit them to the central controller, network controller, and app controller to provision the selected network resources and services for offering to customers.

Figure 4:
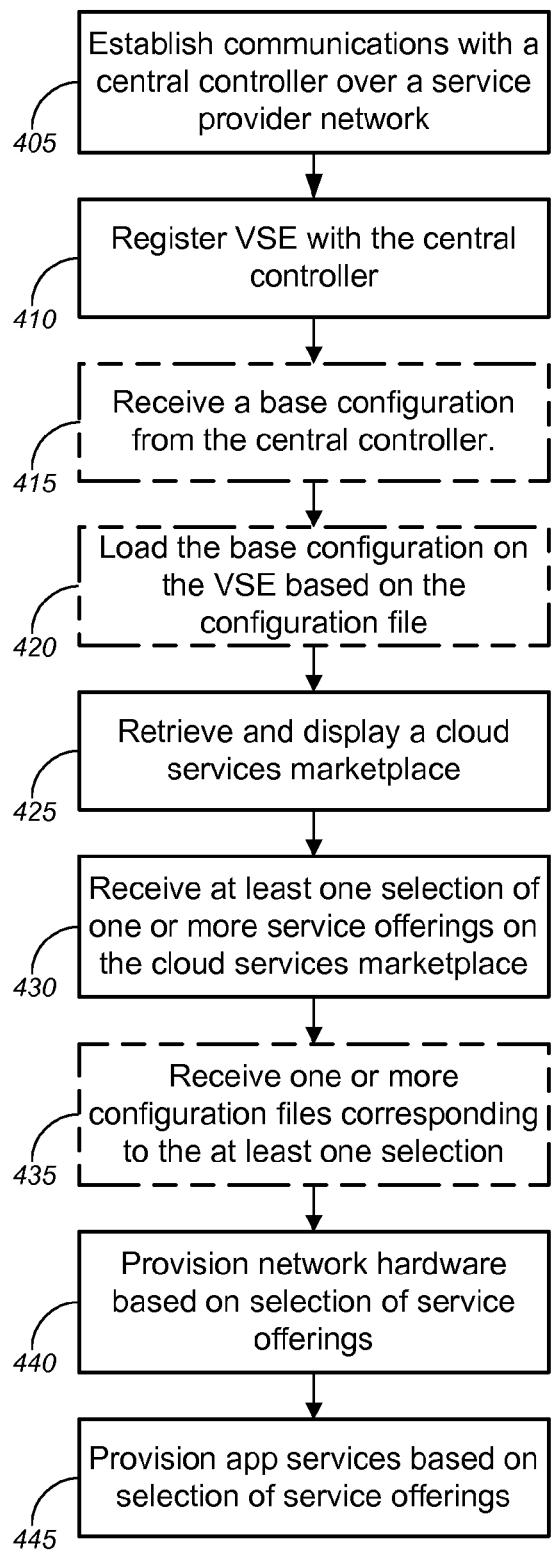
FIG. 4 is a flow chart of a method for provisioning service provider cloud services, in accordance with various embodiments.

FIG. 4 is a flow chart of a method 400 for provisioning service provider cloud services, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 4 can be implemented by (and, in some cases, are described below with respect to) the systems 100, 200, 300, 500, 600, and/or 700 of FIGS. 1, 2, 3, 5, 6, and/or 7, respectively (or components thereof), such methods may also be implemented using any suitable hardware implementation. Similarly, while each of the system 100 (and/or components thereof) of FIG. 1, the system 200 (and/or components thereof) of FIG. 2, the system 300 (and/or components thereof) of FIG. 3, the system 500 (and/or components thereof) of FIG. 5, the system 600 (and/or components thereof) of FIG. 6, and/or the system 700 (and/or components thereof) of FIG. 7 can operate according to the method illustrated by FIG. 4 (e.g., by executing instructions embodied on a computer readable medium), the systems 100, 200, 300, 500, 600, and/or 700 can each also operate according to other modes of operation and/or perform other suitable procedures.

At block 405, a VSE might establish communications with a central controller over a service provider network. In various embodiments, the VSE may establish a connection to the central controller through a wireless or wired connection to a remote node, such as a local DSLAM or other network termination device or system. In some embodiments, as described in the '604 Application (which has already been incorporated herein by reference), the remote node may act directly as the central controller and may host various configuration files. In other embodiments, the remote node may allow the VSE to communicate with the central controller via a service provider network. The VSE may connect to a specific service provider network based on pre-loaded firmware or other code indicating how to initialize the VSE.

At block 410, the VSE might register with the central controller. As described above, the registration of the VSE may include registering a MAC address, gateway IP address, a customer identification number, a customer account number, service codes, and/or other information that identifies the customer, the VSE itself, and/or services to be provided to the VSE.

In various embodiments, the VSE may be pre-loaded with a base configuration that allows the VSE to retrieve and display a graphical interface for a cloud services marketplace. In other embodiments, as shown in optional block 415, the VSE may receive a base configuration from the central controller for retrieving and displaying the cloud services marketplace in response to registering with the central controller (in block 410). At optional block 420, the base configuration might be loaded on the VSE (in some cases, based on the configuration file).

At block 425, the VSE might retrieve and display the cloud services marketplace. The cloud services marketplace may include a plurality of cloud services and/or a plurality of content provider services offered over a cloud services network(s). In various embodiments, where the central controller determines that the VSE is associated with a content provider, such as, for example, during registration, the cloud services marketplace may include various cloud network services and resources available to the content provider for providing content provider services to a customer over the cloud services network and via the cloud services marketplace. In various other embodiments, where the central controller determines that the VSE is associated with an end customer, the cloud services marketplace may include various apps and services provided by one or more content providers. In some further embodiments, cloud services may also be provided directly by a network service provider that hosts the cloud services network.

At block 430, at least one selection of one or more service offerings might be received by the VSE. As described above with respect to block 425, in some embodiments, service offerings may include network services and resources available to a content provider for configuring its own service offerings to be offered on the cloud service network. In other embodiments, the service offerings may include various content provider apps and services available to an end customer. Thus, selections of the various service offerings can be received by the VSE and transmitted to the central, network, and app controllers of the cloud services network.

In embodiments where an end customer selects various content provider apps and services for provisioning, at optional block 435 (for example), the VSE may receive one or more configuration files corresponding to the at least one selection of the one or more configuration files corresponding to the selected service offerings from the cloud services marketplace. In various embodiments, the VSE may transmit selections, by the end customer, of various content provider apps and services, to a central controller. The central controller may then transmit one or more corresponding configuration files to the VSE. The configuration files might include, without limitation, images of various customer premise equipment necessary to provision the one or more selected content provider apps and services. As described above with respect to FIG. 3, various embodiments call for the VSE 300 to function as a host machine running the one or more customer premise equipment images as "guest" virtual machines.

At block 440, the network controller provisions and configures various network hardware, among other cloud resources, to provision the selected cloud and/or content provider apps and services, based on the selection of service offerings. Cloud resources may include, without limitation, network hardware, both dedicated and shared, and network bandwidth.

For example, in embodiments where an end customer selects services to receive over the cloud service network, the network controller may allocate network hardware from a pool of cloud resources to provision the selected cloud apps and services. In some embodiments, the cloud resources may be allocated based on tiers of hardware. The tiers of hardware may be established corresponding to the selected cloud apps or services. Alternatively, in some embodiments, tiers of hardware may be selected based on a customer's desired level of network performance. In such embodiments, the customer may be charged based on the selected tier, on an individual basis determined by a customer's usage of cloud resources, based on the tier of hardware and/or bandwidth required by the cloud apps or services, or simply based on the selected apps and/or services themselves.

Similarly, in embodiments where a content provider selects and configures services to be offered to an end customer over the cloud service network, the network controller may allocate network hardware based on a tiered system. In various embodiments, the content provider may select a tier of hardware to be used with which to provision its services over the cloud service network. In other embodiments, the tiers of hardware may be selected based on the content provider's selections of services to be provided. For example, more hardware intensive services may run on a higher tier of network hardware.

At block 445, the app controller might correspondingly provision various app services based on the selection of service offerings. For example, in some embodiments, a cloud app selected by an end customer may require video streaming services. The app controller might then allocate the necessary resources to provide the video streaming services over the cloud service network, as required by the cloud app. Similarly, where a content provider selects various cloud services for provisioning content provider services on the cloud service network, various embodiments might call for the app controller to allocate the necessary resources to: (1) provide the selected cloud services to the end customer who selects the content provider services; and (2) allow access to the cloud service network and cloud resources to the content provider. For example, in some embodiments, a content provider may select various cloud services, such as video streaming services, monitoring services, and/or content distribution services, or the like. The app controller might provision the necessary resources to allow the selected services to be provided, over a corresponding tier of hardware as selected by the network controller.

Figure 5:
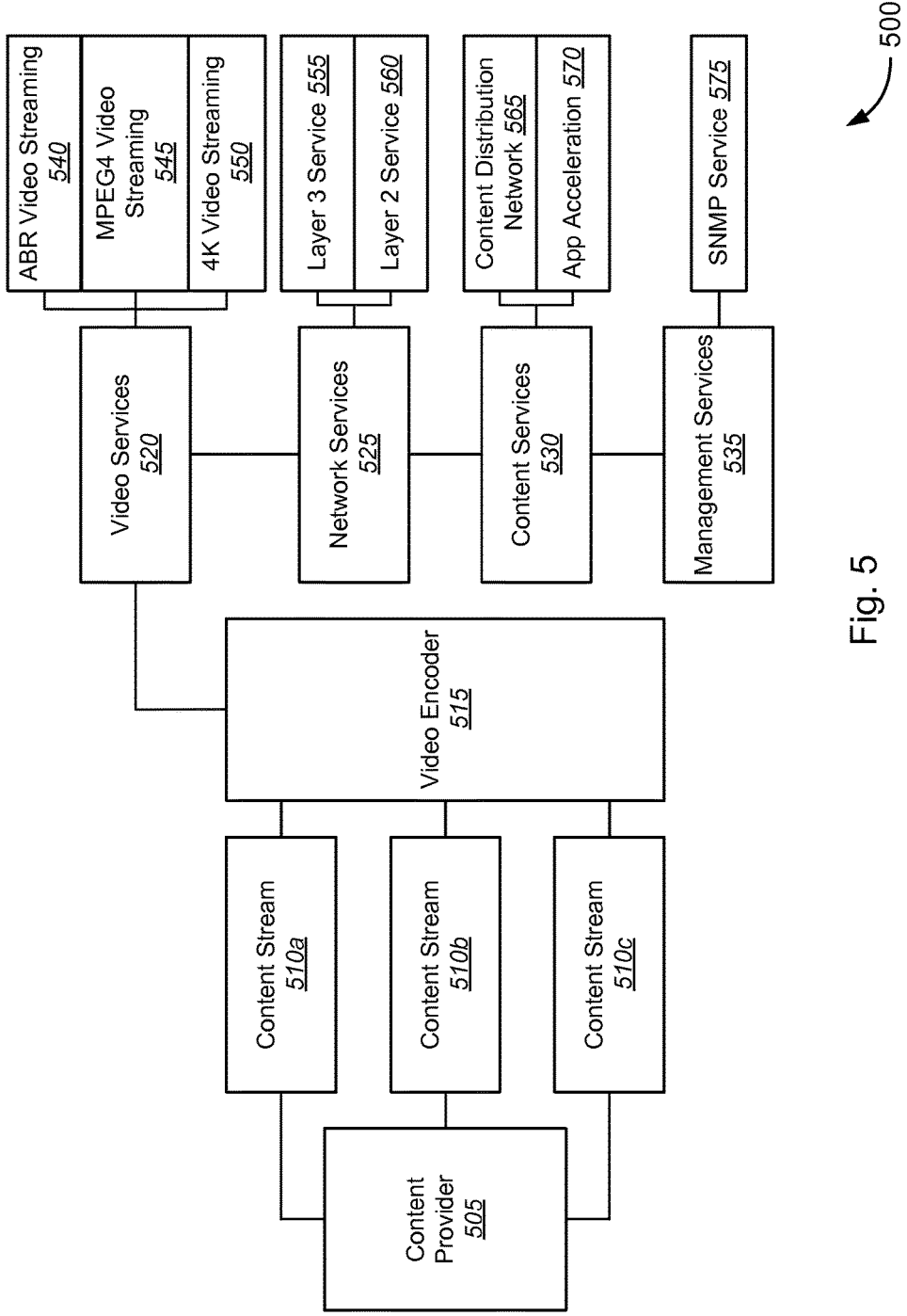
FIG. 5 is a block diagram illustrating the provisioning of content provider services through a cloud service network, in accordance with various embodiments.

FIG. 5 is a block diagram illustrating a system 500 for provisioning content provider services through a cloud service network, in accordance with various embodiments. In this example, a content provider 505 provides multiple streams of content. In the illustrated embodiment, three content streams 510a, 510b, 510c ("510" collectively) are provided by way of example only. In some embodiments, the first content stream 510a may include a content stream for adjustable bitrate media content, the second content stream 510b may include a content stream encoded in MPEG-4, and the third content stream 510c may include 4 K resolution (ultra-high-definition) content, or the like.

Each content stream might include video content to be encoded by video encoder 515 for transmission to a cloud service network for distribution over the cloud service network to an end customer. In some embodiments, the video encoder 515 may encode the content streams 510 in real-time for live transmission to a cloud services network.

In other embodiments, the content streams 510 may be encoded and transmitted to the cloud service network for storage and on-demand access.

Encoded video content from encoder 515 take advantage of various cloud services to provide the content provider services. These cloud services may include, without limitation, video services 520, network services 525, content services 530, and/or management services 535, or the like.

Video services may include various types of video streaming services. In the depicted embodiments, video services might include, but are not limited to, adjustable bitrate (ABR) video streaming service 540, MPEG-4 video streaming service 545, and/or 4 K resolution video streaming service 550, or the like. Thus, video services include any services needed for streaming in the above formats and/or resolutions, or the like.

Network services 525 might include layer 3 network services 555 and/or layer 2 network services 560, or the like. Layer 3 network services 555 may include services on the network layer of the OSI model of computer networking. Layer 3 services 555 may include services related to message forwarding, routing, and host addressing, among others. Layer 2 services 560 might include services related to the data link layer, or the transfer of data between devices on the network or connected to the cloud services network.

Content services 530 might include content distribution network service 565 and app acceleration services 570. In some embodiments, content distribution network service 565 may include providing content distribution network functionality to the content provider via the cloud services network. App acceleration services 570 may include specific services purchased by the content provider to accelerate the performance or functionality of a particular content provider's apps and services on the cloud service network. This could include access speeds to customers in the last mile, among others.

Management services 535 may include SNMP service 575. SNMP services 575 might include SNMP based network management functionality, such as network monitoring services, and usage reporting services.

The content provider 505 is able to utilize the services mentioned above, or the like, to provide content provider services over a cloud services network.

Figure 6:
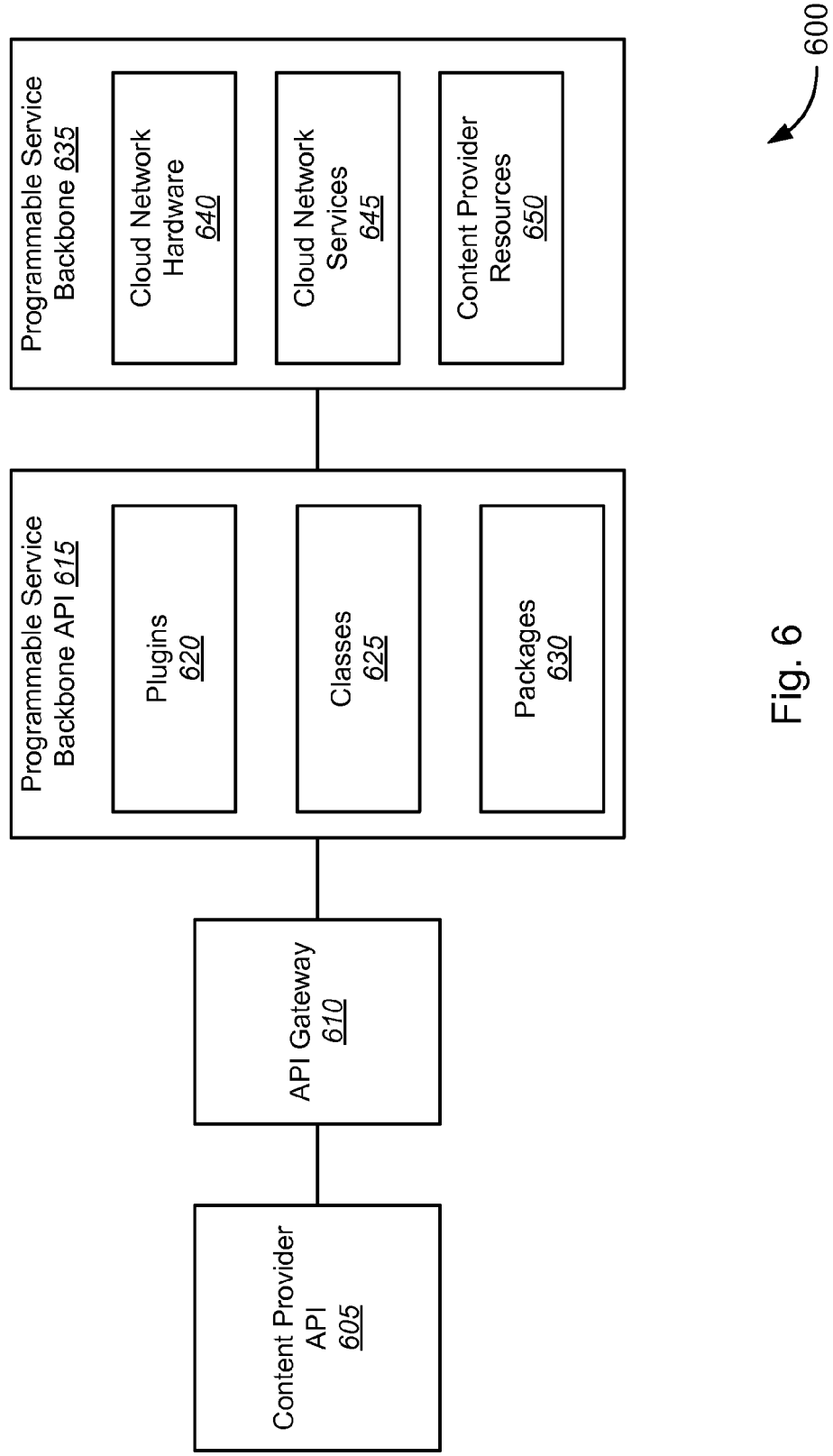
FIG. 6 is a block diagram of a network function virtualization ("NFV") application programming interface ("API") as used in the service provider cloud services system, in accordance with various embodiments.

FIG. 6 is a block diagram of a network function virtualization ("NFV") application programming interface ("API") system 600 as used in the service provider cloud services system, in accordance with various embodiments. In the NFV API system 600, the content provider API 605 might interface with a programmable service backbone ("PSB") API 615 via an API gateway 610. API gateway 610 might control access to the PSB API 615. PSB API 615 may include, without limitation, various plugins 620, classes 625, and/or packages 630, or the like, for accessing various parts of the PSB 635 itself. The PSB 635 might include various programmable network elements, functions, and/or services, or the like, that can be accessed and defined by a content provider. This can include, without limitation, cloud network hardware 640, cloud network services 645, and/or (optional) content provider provided resources 650, or the like. In various embodiments, the API layer 245, described above with respect FIG. 2, may comprise all or part of the NFV API system 600.

In various embodiments, the API gateway 610 might be configured to control access to PSB API 615. The API gateway 610 may allow access to an application programming interface (API) layer, based on the various services selected by the content provider from the cloud services marketplace. In some embodiments, the API gateway 610 further comprises a security layer configured to handle the authentication of users. Although the security layer, in this embodiment, is comprised within the API gateway, the various embodiments are not so limited, and the security layer may be comprised within any suitable apparatus. The security layer of the API gateway 610 may implement one or more standards or protocols for authentication. For example, the one or more authentication standards and protocols may include, without limitation, message authentication code ("MAC") based standards, OAuth, OpenID, Public Key Infrastructure, basic access authentication, or 2-Factor authentication. The content provider can then access and configure the various cloud resources corresponding to the services selected from the cloud services marketplace by utilizing the PSB API 615.

For example, according to one set of embodiments, the content provider, via the VSE, may connect to an authentication server. In various embodiments, all or part of the authentication server may be comprised within a central controller, a cloud marketplace server (as described below with respect to FIG. 7), or other server on the service provider network. The authentication server may then redirect the VSE to the API gateway 610. In various embodiments, the API gateway 610 may run on the authentication server, or may operate on a separate server on the service provider network. The API gateway 610 then requests an authorization from the user. In various embodiments, the authorization may be presented by the VSE or central controller automatically. In some embodiments, the authorization may be based on the selection of cloud services from the cloud services marketplace by a content provider. In other embodiments, the authorization may serve to identify the content provider or VSE itself. Alternatively, the authorization may be supplied manually by the content provider, via the VSE, to the API gateway 610. Once submitted, the API gateway 610 verifies the authorization and level of access to grant based on the authorization, and creates an access token. In this way, the content provider may then access or call corresponding cloud resources from a resource server, such as the network controller 120 described above with respect to FIG. 1, by utilizing the access token.

Thus, utilizing any of the one or more authentication standards or protocols, the content provider is able to access cloud resources in order to define various content provider apps and services, NFV applications, and software defined networks within cloud service network, as part of the PSB 635. These various programmable elements include might include, without limitation, cloud network hardware 650, cloud network services 645, and/or, optionally, various content provider provided resources 650, or the like. Content provider provided resources 650 may be defined as part of the PSB 635, and may utilize the PSB API 615 to call on various other cloud resources. In some embodiments, the PSB 635 may further include virtualized customer premises equipment, or images thereof, which may be transmitted to or may run on an end customer's VSE or virtually on the cloud service network as part of the PSB 635.

In further embodiments, the PSB API 615 and PSB 635 are defined and maintained by the network service provider operating the cloud services network. The network service provider may open a set of APIs to various third parties, such as a content provider, to be used in various applications and use cases. The network service provider may also create general guidelines for programmers to use and interface with the network service provider's various NFV functions. Thus, the network provider can create and develop an entire specification of object oriented classes, including, but not limited to, java packages 630, C++ and generic C classes 625 for use by the content provider to program, and can configure a programmable service backbone for its apps and services.

According to one set of embodiments, various cloud network hardware 640 may be allocated by a hardware controller as described with respect to the above embodiments. The cloud network hardware, once provisioned, may be called by the content provider apps and services that utilize the PSB API 615. Similarly, cloud network services 645 may be allocated and provisioned by an app controller as described with respect to the above embodiments. The cloud network services 645 may be called, accessed, or utilized by a content provider via the PSB API 615. In some further embodiments, the programmable service backbone 635 may be defined or programmed to include various network resources provided by the content provider on a separate network from the cloud service network. This may include, without limitation, the content provider's own servers, CDN, and/or other network resources, or the like.

In further embodiments, the PSB API 615 may include a test suite for testing how cloud resources and NFV functions are invoked, for example, by a content provider app. The test suite may include a set of classes for testing how the PSB API 615 is used. For example, in some embodiments, the test suite may include access to various functions of a network policy compliance server or tool.

Figure 7:
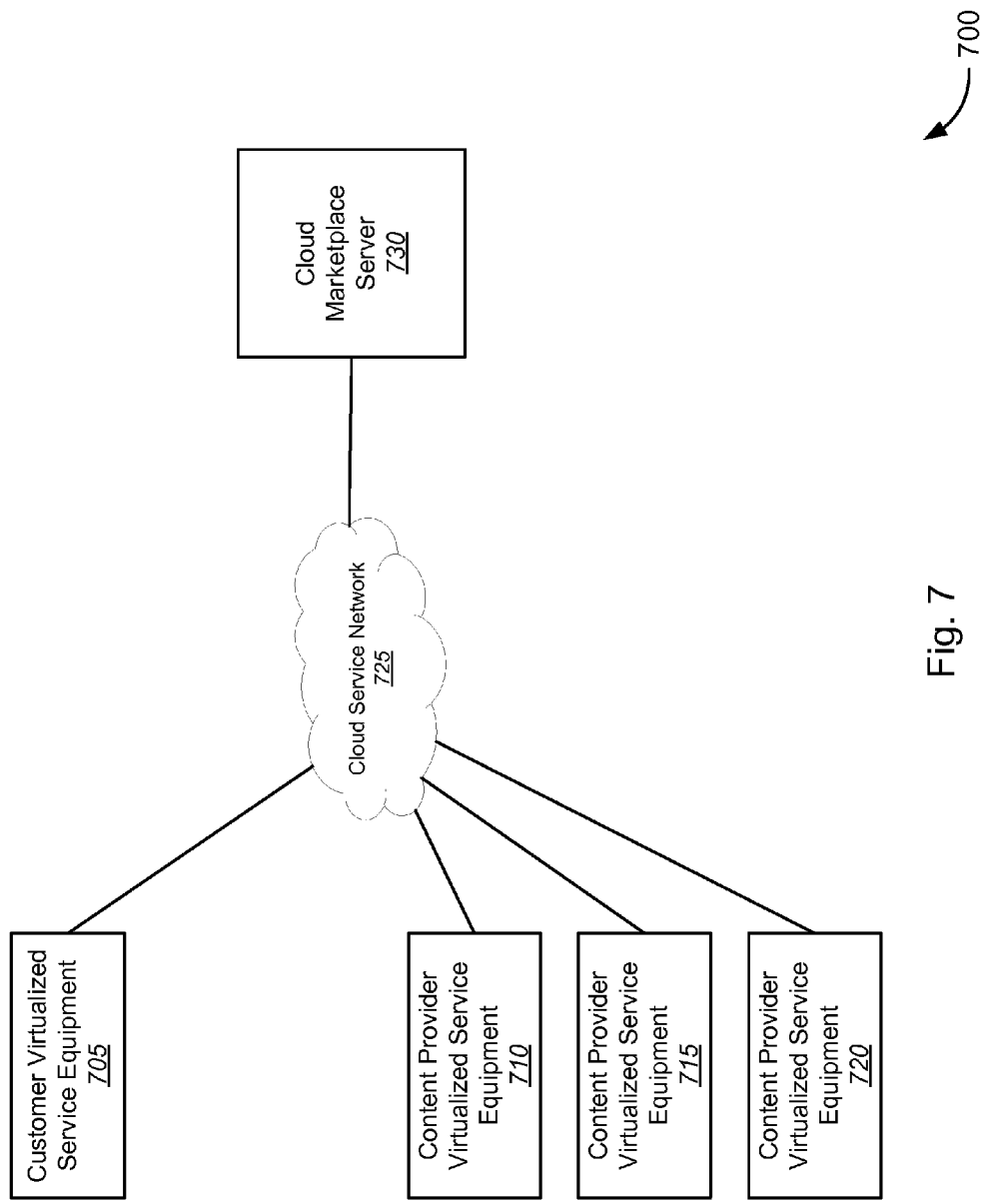
FIG. 7 is a block diagram of a cloud services marketplace system for provisioning service provider cloud services, in accordance with various embodiments.

FIG. 7 is a block diagram of a cloud services marketplace system 700 for provisioning service provider cloud services, in accordance with various embodiments. Cloud marketplace server 730 is coupled to customer VSE 705, and multiple content provider VSEs 710, 715, 720, via cloud service network 725. Cloud marketplace server 730 might host the cloud services marketplace and might dynamically update service offerings and/or product offerings available to both customers and the content provider. In various embodiments, the central controller 115, described above with respect to FIG. 1, may comprise all or part of the cloud marketplace server 730. In embodiments where an end customer accesses, via the VSE 705, the cloud services marketplace, the cloud services marketplace may include various content provider apps and services, as well as cloud services provided by a network service provider, that are available to an end customer. Where a content provider accesses, via the VSE 710, the cloud services marketplace, the cloud services marketplace may include various cloud services and resources available to a content provider for purchase.

According to one set of embodiments, an end customer might connect customer VSE 705 into a network that is communicatively coupled with cloud service network 725. The customer VSE 705 might establish a connection with the cloud marketplace server 730, which might transmit the most recent offerings in the cloud services marketplace to the customer VSE 705. The customer VSE 705 might then graphically display the cloud services marketplace to the end customer, who can then choose available service offerings on the cloud services marketplace.

Each service offering in the cloud services marketplace has a unique qualifier associated with it. For example, in one embodiment, a customer may choose DSL Internet service, having a speed of 20 megabits per second ("Mbps"), and offered from a network service provider. This service offering may have a qualifier (e.g., "CTL_DSL_20MBPS," or the like). The qualifier serves to uniquely identify the service offering to a central controller, network controller, and/or app controller, or the like for provisioning the selected service. In some embodiments, for example, the qualifier "CTL_DSL_20MBPS" may be transmitted by the customer VSE 705 to the cloud service network 725. In response, the central controller may transmit a configuration file having an image for a CPE, such as a residential gateway. The network controller may configure cloud network hardware for providing Internet connectivity to the VSE 705, and the app controller may configure app related services for provisioning the selected Internet services to the VSE 705.

In other embodiments, the service offering selected by the customer may include more than one qualifier. For example, the service offering may be a video streaming application. The video streaming application may require various services, such as a 20 Mbps Internet connection, live video service, on demand video service, a configuration file for set top box functionality, and/or a permanent video streaming connection, or the like. In such embodiments, when the video streaming application is selected by an end customer, qualifiers associated with each of the required services may be sent to the cloud services network 725. For example, CTL_DSL_20MBPS or the like may be a qualifier for the Internet connection, CTL_CDN_SERVICES_LIVE or the like as a qualifier for the live video services, CTL_CDN_SERVICES_VOD or the like as a qualifier for video on demand services; CTL_CPE_VSE_VIDEO_SETUP or the like as a qualifier for the set top box functionality; and PERMANENT_CONENCTION or the like as the qualifier for a permanent video streaming connection.

In embodiments where a content provider wishes to setup and offer its services on the cloud services marketplace, the content provider might connect the content provider VSE 710 to the cloud service network 725. The content provider VSE 710 might establish a connection with the cloud marketplace server 730, which might transmit the most recent offerings in the cloud services marketplace to the content provider VSE 710. The content provider VSE 710 might then graphically display the cloud services marketplace to the content provider, who can then choose service offerings available from the network service provider to the content provider. In various embodiments, the network service provider hosting the cloud service network 725 might define the various service offerings available to the content provider, including terms and conditions, costs, and/or service level agreements, among others. These may correspond to various tiers of available cloud network resources and services, such as hardware, as described with respect to the above embodiments. The network service provider might then publish the service offerings to the cloud services marketplace.

In some embodiments, various service offerings, or combinations of service offerings may be pre-approved for automatic authentication by the network service provider. For example, a content provider may select a combination of cloud services for offering its content provider services to an end customer through the cloud services marketplace. When the content provider lists its content provider apps and services in the cloud services marketplace, the content provider app and/or service may be automatically authenticated based on the cloud services selected by the content provider.

Figure 8:
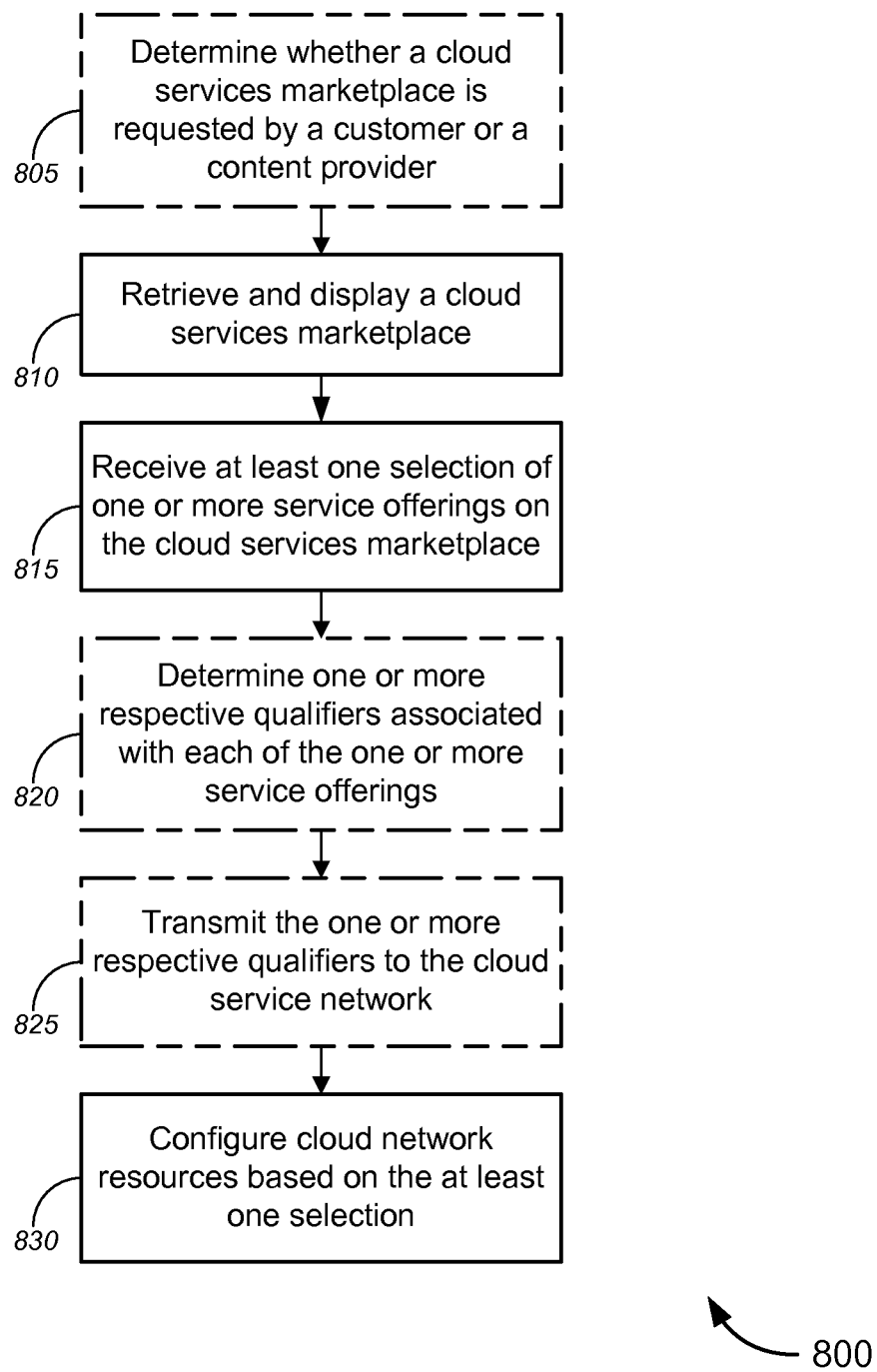
FIG. 8 is a flow diagram of a method for end customers to provision service provider cloud services via the cloud services marketplace, in accordance with various embodiments.

FIG. 8 is a flow diagram of a method 800 for end customers to provision service provider cloud services via the cloud services marketplace, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 8 can be implemented by (and, in some cases, are described below with respect to) the systems 100, 200, 300, 500, 600, and/or 700 of FIGS. 1, 2, 3, 5, 6, and/or 7, respectively (or components thereof), such methods may also be implemented using any suitable hardware implementation. Similarly, while each of the system 100 (and/or components thereof) of FIG. 1, the system 200 (and/or components thereof) of FIG. 2, the system 300 (and/or components thereof) of FIG. 3, the system 500 (and/or components thereof) of FIG. 5, the system 600 (and/or components thereof) of FIG. 6, and/or the system 700 (and/or components thereof) of FIG. 7 can operate according to the method illustrated by FIG. 8 (e.g., by executing instructions embodied on a computer readable medium), the systems 100, 200, 300, 500, 600, and/or 700 can each also operate according to other modes of operation and/or perform other suitable procedures.

At optional block 805, it may be determined whether the cloud services marketplace is requested by a customer or a content provider. At initialization, it may be determined whether or not the user or VSE is associated with an end customer or a content provider. In some embodiments, the determination may occur during registration of the VSE with a central controller, and an appropriate base configuration may be transmitted based on this determination. In other embodiments, the VSE may be pre-loaded, by a network service provider, with a different configuration depending on whether the VSE is for an end customer or a content provider.

At block 810, the cloud services marketplace may be retrieved and displayed by the VSE. In various embodiments, the cloud services marketplace may be a file containing an index or table of service offerings, which the VSE may graphically render. The VSE may determine how and what service offerings to display based on whether an end customer or content provider is accessing the cloud services marketplace, for example, based on the base configuration loaded. In other embodiments, the cloud services marketplace may be a web portal styled interface having various service offerings stored in a database. In such embodiments, the VSE may access different web portals, as appropriate for the end customer or content provider using the VSE.

At block 815, at least one selection of one or more service offerings on the cloud services marketplace might be received by the VSE. The service offerings may include, without limitation, content provider apps and/or services, cloud services and/or resources available from the network service provider, or a combination of both. The service offerings may differ based on whether the user of the VSE is an end customer or content provider. For example, in some embodiments, when a content provider lists its apps or services on the cloud services marketplace, the content provider may be presented with only the cloud services and resources available to the content provider for purchase. However, the content provider may not be presented with apps and services listed by other content providers utilizing the cloud services marketplace. Thus, the cloud services marketplace may list both content provider service offerings available to end customers, as well as service offerings provided by the network service provider to content providers to allow the content providers to create their own service offerings.

At optional block 820, one or more respective qualifiers might be determined for each of the one or more selected service offerings. At optional block 825, the one or more respective qualifiers might be transmitted to the cloud service network. In various embodiments, the service offerings may be associated with a qualifier. As described above with respect to FIG. 7, the qualifiers may indicate one or a combination of services required by the service offering. The qualifiers may be transmitted to a central controller, network controller, app controller, and/or other suitable devices on the cloud service network to configure cloud resources necessary to provision the selected service offering to the customer. In some embodiments, at block 830, cloud network resources are configured based on the at least one selection. In some embodiments, this may include configuring the cloud network resources based on the transmitted qualifiers. In other embodiments, cloud network resources may be allocated, or access to various cloud network resources may be granted to a content provider. In some cases, the network controller might provision cloud network resources based on the one or more respective qualifiers. In some instances, the app controller might provision app services based on the one or more respective qualifiers. According to some embodiments, at least one cloud service might invoke at least one virtualized network function based on the one or more respective qualifiers.

Figure 9:
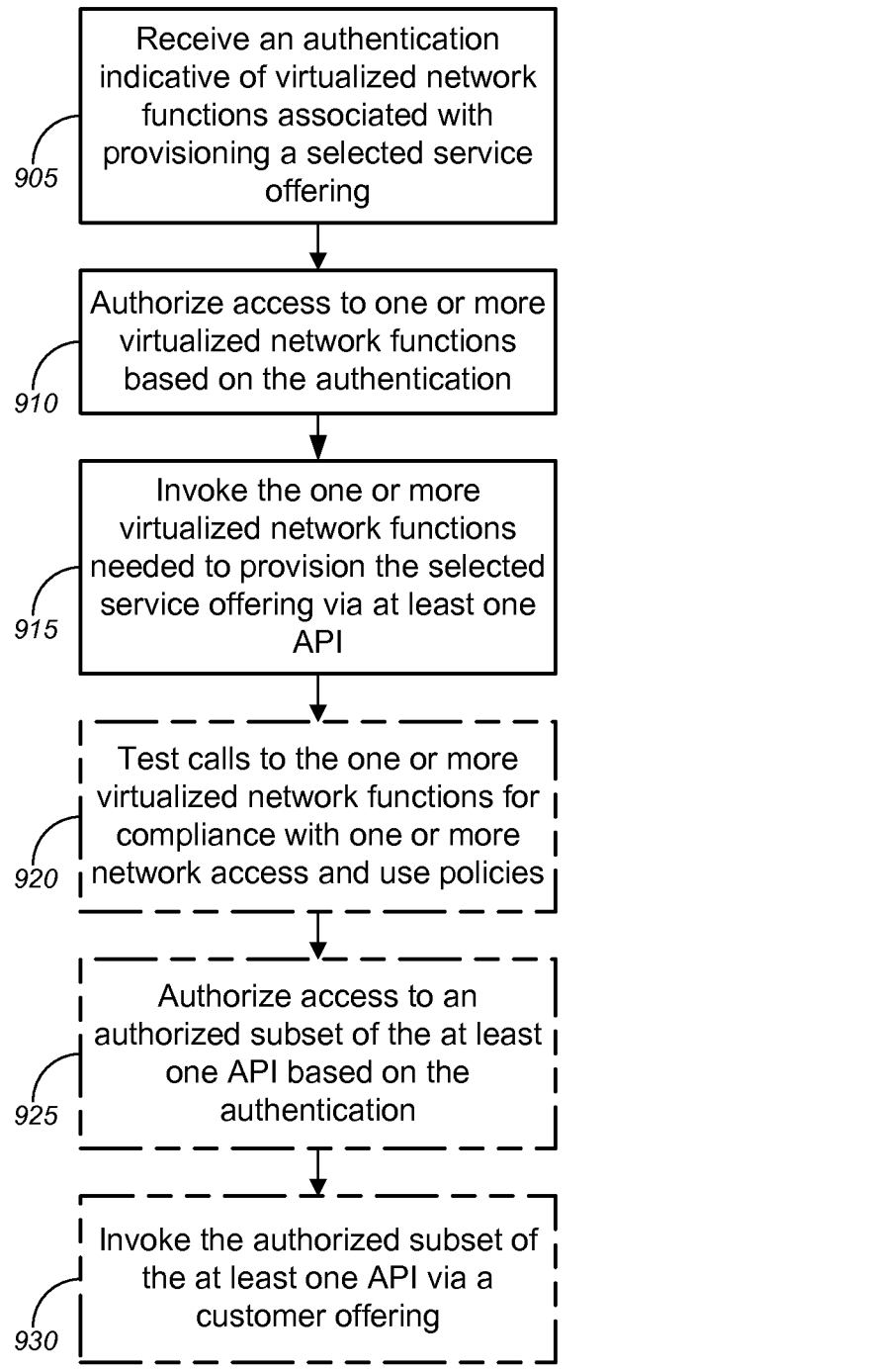
FIG. 9 is a flow diagram of a method for invoking virtualized network functions needed to provision selected service offerings, in accordance with various embodiments.

FIG. 9 is a flow diagram of a method 900 for invoking virtualized network functions needed to provision selected service offerings, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 9 can be implemented by (and, in some cases, are described below with respect to) the systems 100, 200, 300, 500, 600, and/or 700 of FIGS. 1, 2, 3, 5, 6, and/or 7, respectively (or components thereof), such methods may also be implemented using any suitable hardware implementation. Similarly, while each of the system 100 (and/or components thereof) of FIG. 1, the system 200 (and/or components thereof) of FIG. 2, the system 300 (and/or components thereof) of FIG. 3, the system 500 (and/or components thereof) of FIG. 5, the system 600 (and/or components thereof) of FIG. 6, and/or the system 700 (and/or components thereof) of FIG. 7 can operate according to the method illustrated by FIG. 9 (e.g., by executing instructions embodied on a computer readable medium), the systems 100, 200, 300, 500, 600, and/or 700 can each also operate according to other modes of operation and/or perform other suitable procedures.

At block 905, method 900 might comprise receiving an authentication indicative of virtualized network functions associated with provisioning a selected service offering. Method 900, at block 910, might comprise authorizing access to one or more virtualized network functions based on the authentication. Method 900 might further comprise, at block 915, invoking the one or more virtualized network functions needed to provision the selected service offering via at least one application programming interface. In some embodiments, blocks 905-915 of method 900 might be performed by an API gateway or other controller, each of which may run on any suitable device, including, but not limited to, a user device, a customer premises equipment, a service provider device, a virtual machine, other computing device, and/or the like. In some cases, a single device or controller might implement the processes of blocks 905-915. In other cases, a first device or controller might implement one or more processes of blocks 905-915, while a second or third device or controller might implement another one or more processes of blocks 905-915. At optional block 920, method 900 might comprise testing calls to the one or more virtualized network functions for compliance with one or more network access and use policies. In various embodiments, testing calls to the one or more virtualized network functions may be performed by any suitable software running on any of the devices described herein or the like, or by any of the controllers or devices described herein or the like. For example, testing calls to the one or more virtualized network functions may be performed on a virtual machine with a test image loaded, for testing the setup. This could test one or more of layers 1-7 of the open systems interconnection ("OSI") model.

Method 900 might further comprise authorizing access to an authorized subset of the at least one application programming interface based on the authentication (optional block 925) and invoking the authorized subset of the at least one application programming interface via a customer offering (optional block 930). The customer offering may be a service offering the selection of which causes invocation of the one or more virtualized network functions. In some embodiments, processes of blocks 925-930 of method 900 might be performed by an API gateway or other controller, each of which may run on any suitable device, including, but not limited to, a user device, a customer premises equipment, a service provider device, a virtual machine, other computing device, and/or the like. In some cases, a single device or controller might implement the processes of blocks 925-930. In other cases, a first device or controller might implement the process of block 925, while a second device or controller might implement the process of block 930.

Figure 10:
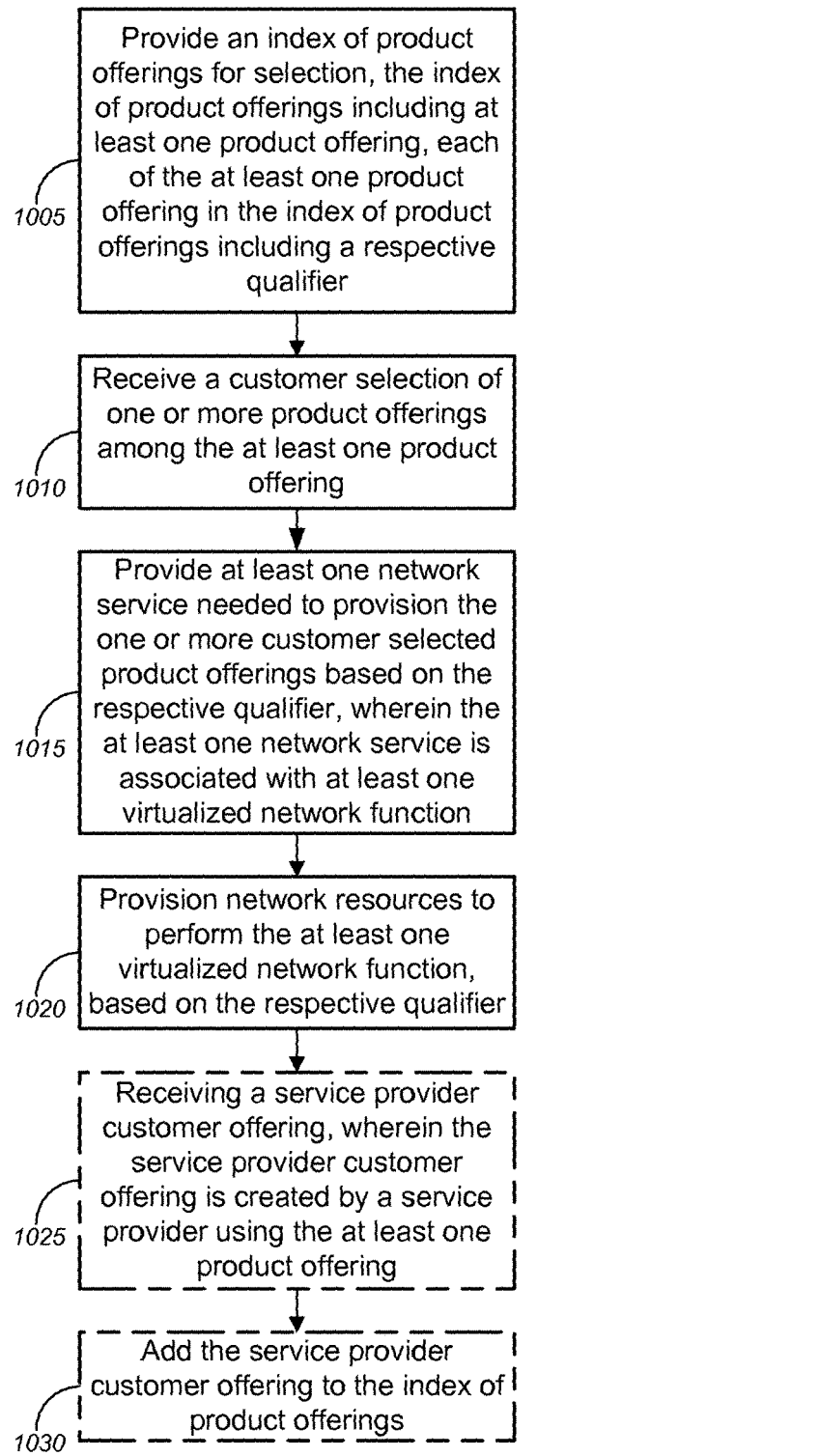
FIG. 10 is a flow diagram of a method for providing and/or implementing a cloud services marketplace, in accordance with various embodiments.

FIG. 10 is a flow diagram of a method 1000 for providing and/or implementing a cloud services marketplace, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 10 can be implemented by (and, in some cases, are described below with respect to) the systems 100, 200, 300, 500, 600, and/or 700 of FIGS. 1, 2, 3, 5, 6, and/or 7, respectively (or components thereof), such methods may also be implemented using any suitable hardware implementation. Similarly, while each of the system 100 (and/or components thereof) of FIG. 1, the system 200 (and/or components thereof) of FIG. 2, the system 300 (and/or components thereof) of FIG. 3, the system 500 (and/or components thereof) of FIG. 5, the system 600 (and/or components thereof) of FIG. 6, and/or the system 700 (and/or components thereof) of FIG. 7 can operate according to the method illustrated by FIG. 10 (e.g., by executing instructions embodied on a computer readable medium), the systems 100, 200, 300, 500, 600, and/or 700 can each also operate according to other modes of operation and/or perform other suitable procedures.

Method 1000 might comprise, at block 1005, providing an index of product offerings for selection, the index of product offerings including at least one product offering. Each of the at least one product offering in the index of product offerings might include a respective qualifier. At block 1010, method 1000 might comprise receiving a customer selection of one or more product offerings among the at least one product offering. Method 1000, at block 1015, might comprise providing at least one network service needed to provision the one or more customer selected product offerings based on the respective qualifier. In some cases, the at least one network service might be associated with at least one virtualized network function. Method 1000 might further comprise provisioning network resources to perform the at least one virtualized network function, based on the respective qualifier (block 1020).

In some embodiments, at optional block 1025, method 1000 might comprise receiving a service provider customer offering. In some instances, the service provider customer offering might be created by a service provider using the at least one product offering. At optional block 1030, method 1000 might comprise adding the service provider customer offering to the index of product offerings.

According to some embodiments, processes of blocks 1005-1030 of method 1000 might be performed by a controller, which might include a network controller or central controller, or the like. In some cases, one type of controller (e.g., one of a network controller or a central controller, or the like) might perform all of the processes of blocks 1005-1030. In some instances, one type of controller (e.g., one of a network controller or a central controller, or the like) might perform some of the processes of blocks 1005-1030, while another type of controller (e.g., another one of the network controller or the central controller, or the like) might perform the other processes of blocks 1005-1030.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for invoking virtualized network functions, the system comprising:
a programmable network element configured to provide at least one virtualized network function, wherein the at least one virtualized network function associated with a service offering;
an application programming interface gateway comprising:

a processor;
a non-transitory computer readable medium having encoded thereon a set of instructions executable by the processor to:
provide a security layer;
manage access to an application programming interface;
invoke, via the application programming interface, the at least one virtualized network function of the programmable network element in response to a user selection of the service offering; and
a customer premises equipment associated with the user comprising a virtualized service equipment, wherein the virtualized service equipment is in communication with the application programming interface gateway, wherein the virtualized service equipment is configured to send authentication indicative of selected virtualized network functions associated with the service offering to the security layer of the application programming interface gateway in response to the user selection of the service offering,
wherein the security layer releases, based on the authentication, an authorized subset of virtualized network functions including the at least one virtualized network function to provision the service offering, and wherein the security layer releases an authorized subset of application programming interfaces including the application programming interface to access the authorized subset of virtualized network functions.

2. The system of claim 1, wherein the service offering comprises one or more network services.

3. The system of claim 1, wherein the service offering comprises one or more app services.

4. The system of claim 1, wherein the at least one application programming interface is configured to be implemented in one or more integrated development environments.

5. The system of claim 1, wherein the at least one application programming interface includes one or more test suites, wherein the one or more test suites determine whether applications invoking the application programming interface comply with one or more network access and use policies.

6. The system of claim 1, further comprising:
an operating system, which is associated with the at least one application programming interface, configured to access the programmable service backbone, wherein the at least one application programming interface invokes the at least one virtualized network function via the operating system.

7. The system of claim 1, wherein the at least one application programming interface comprises a set of application programming interfaces, wherein the security layer releases an authorized subset of the set of application programming interfaces based on the authentication.

8. An apparatus, comprising:
an application programming interface gateway comprising:
a processor;
a non-transitory computer readable medium having encoded thereon a set of instructions executable by the processor to:
manage access to an application programming interface;
invoke, via the application programming interface, at least one virtualized network function of a programmable network element in response to a user selection of the service offering; and
provide a security layer that releases, based on the authentication, an authorized subset of virtualized network functions including the at least one virtualized network function to provision the service offering, and wherein the security layer releases an authorized subset of application programming interfaces including the application programming interface to access the authorized subset of virtualized network functions, wherein the authentication is sent by virtualized service equipment that is associated with a user and is incorporated in a device associated with the user.

9. The apparatus of claim 8, wherein the apparatus is an application programming interface gateway.

10. The apparatus of claim 8, wherein the service offering comprises one or more network services.

11. The apparatus of claim 8, wherein the service offering comprises one or more app services.

12. The apparatus of claim 8, wherein the at least one application programming interface includes one or more test suites, wherein the one or more test suites determine whether applications invoking the application programming interface comply with one or more network access and use policies.

13. The apparatus of claim 8, wherein the at least one application programming interface invokes the at least one virtualized network function via an operating system associated with the at least one application programming interface.

14. The apparatus of claim 8, wherein the security layer releases an authorized subset of the at least one application programming interface based on the authentication.

15. The apparatus of claim 14, wherein a service offering comprises a customer offering, wherein the authorized subset of the at least one application programming interface is configured to be invoked by the customer offering.

16. The apparatus of claim 15, wherein the authorized subset of the at least one application programming interface is configured to be made available in one or more integrated development environments.

17. A method for invoking virtualized network functions, the method comprising:
receiving an authentication indicative of virtualized network functions associated with provisioning a selected service offering, wherein the authentication is sent by virtualized service equipment that is associated with a user and is incorporated in a device associated with the user;
authorizing access to one or more virtualized network functions based on the authentication;
invoking the one or more virtualized network functions needed to provision the selected service offering via at least one application programming interface;
releasing, with a security layer, an authorized subset of virtualized network functions including the at one or more virtualized network functions to provision the service offering, based on an authentication; and
releasing, with the security layer, an authorized subset of application programming interfaces including the application programming interface to access the authorized subset of virtualized network functions.

18. The method of claim 17, further comprising:
testing calls to the one or more virtualized network functions for compliance with one or more network access and use policies.

19. The method of claim 17, wherein each of the one or more virtualized network functions is invoked via a system invocation in an operating system associated with the at least one application programming interface.

20. The method of claim 17, further comprising:
authorizing access to an authorized subset of the at least one application programming interface based on the authentication.

21. The method of claim 20, further comprising:
invoking the authorized subset of the at least one application programming interface via a customer offering, wherein the customer offering is a service offering the selection of which causes invocation of the one or more virtualized network functions.

\* \* \* \* \*